US012634603B2

(12) United States Patent
Kim et al.

(10) Patent No.: US 12,634,603 B2
(45) Date of Patent: May 19, 2026

(54) IMAGE SENSOR DEVICE AND OPERATION METHOD THEREOF

(71) Applicant: SAMSUNG ELECTRONICS CO., LTD., Suwon-si (KR)

(72) Inventors: Sangwoo Kim, Suwon-si (KR); Moo Young Kim, Suwon-si (KR); Yunhong Kim, Suwon-si (KR); Hyunjong Kim, Suwon-si (KR); Chanmin Park, Suwon-si (KR); Mira Lee, Suwon-si (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 110 days.

(21) Appl. No.: 18/523,624

(22) Filed: Nov. 29, 2023

(65) Prior Publication Data

US 2024/0340549 A1     Oct. 10, 2024

(30) Foreign Application Priority Data

Apr. 7, 2023     (KR) ......................... 10-2023-0046237

(51) Int. Cl.
*H04N 25/709*     (2023.01)
*H04N 25/76*     (2023.01)

(52) U.S. Cl.
CPC ........... *H04N 25/709* (2023.01); *H04N 25/76* (2023.01)

(58) Field of Classification Search
CPC .... H04N 25/709; H04N 25/76; H04N 25/627; H04N 25/78; H04N 25/616; H04N 25/40; H04N 25/766

USPC ......................................................... 348/300
See application file for complete search history.

(56) References Cited

U.S. PATENT DOCUMENTS

| | | | |
|---|---|---|---|
| 7,218,260 B2 | 5/2007 | Lim | |
| 8,754,970 B2 | 6/2014 | Mori | |
| 10,164,123 B2 | 12/2018 | Yoshii et al. | |
| 10,666,883 B2 * | 5/2020 | Kim ........................ | H04N 25/78 |
| 11,233,962 B2 | 1/2022 | Jung et al. | |
| 11,289,528 B2 | 3/2022 | Yamashita | |
| 2019/0007632 A1 * | 1/2019 | Kim .................... | H04N 25/617 |
| 2020/0252560 A1 * | 8/2020 | Kim .................... | H04N 25/617 |
| 2021/0314518 A1 * | 10/2021 | Ushinaga ............ | H03M 1/0872 |

FOREIGN PATENT DOCUMENTS

| | | |
|---|---|---|
| JP | 2014-042211 | 3/2014 |
| JP | 6049304 | 12/2016 |

* cited by examiner

*Primary Examiner* — Lin Ye
*Assistant Examiner* — Chan T Nguyen
(74) *Attorney, Agent, or Firm* — Fish & Richardson P.C.

(57) ABSTRACT

Disclosed is an image sensor device which includes a pixel that outputs a first pixel signal to a first column line during a first time period and outputs a second pixel signal to the first column line during a second time period, and a clamp circuit that outputs a first clamp signal to the first column line during the first time period. During the first time period, a voltage of the first column line is determined based on the first pixel signal and the first clamp signal. The pixel operates based on a first power supply voltage, and the clamp circuit operates based on a second power supply voltage lower than the first power supply voltage.

11 Claims, 17 Drawing Sheets

|  | Simulation 1 | Simulation 2 |
|---|---|---|
| VDDC(V) | 2.2 | 1.8 |
| Avg(V) | 1.773 | 1.718 |
| Std(V) | 0.024 | 0.011 |

100

IMAGE SENSOR DEVICE AND OPERATION METHOD THEREOF

CROSS-REFERENCE TO RELATED APPLICATIONS

This application claims priority under 35 U.S.C. § 119 to Korean Patent Application No. 10-2023-0046237 filed on Apr. 7, 2023, in the Korean Intellectual Property Office, the disclosure of which is incorporated by reference herein in its entireties.

BACKGROUND

An image sensor converts light received from the outside into an electrical signal. The image sensor is classified as a complementary metal oxide semiconductor (CMOS) image sensor or a charge coupled device (CCD) image sensor. Because it is possible to manufacture the CMOS image sensor through typical semiconductor manufacturing equipment, the CMOS image sensor is relatively inexpensive compared to the CCD image sensor. The CCD image sensor may obtain an image of an improved quality compared to the CMOS image sensor.

In particular, in the CMOS image sensor field, nowadays, an analog-to-digital conversion operation using a correlated double sampling (CDS) technique is performed to improve the reliability of image data through noise cancellation. A reset sampling operation may be performed for the analog-to-digital conversion operation. In the case where the intensity of light incident onto the image sensor is high, a voltage level of a reset voltage may excessively decrease in the process of performing the reset sampling operation. In this case, a sun spot phenomenon may occur. A clamp circuit may be used to prevent the sun spot phenomenon. However, due to an operating characteristic of the clamp circuit, a phenomenon that the voltage level of the reset voltage is higher than a preset value may occur under a specific condition. To cope with the above phenomenon, an output voltage of the clamp circuit may be set to be relatively small. In this case, the sun spot phenomenon may not be prevented.

SUMMARY

Implementations of the present disclosure provide an image sensor device with improved reliability and improved performance and an operation method thereof.

According to some implementations, an image sensor device includes a pixel that outputs a first pixel signal to a first column line during a first time period and outputs a second pixel signal to the first column line during a second time period, and a clamp circuit that outputs a first clamp signal to the first column line during the first time period. During the first time period, a voltage of the first column line is determined based on the first pixel signal and the first clamp signal. The pixel operates based on a first power supply voltage, and the clamp circuit operates based on a second power supply voltage lower than the first power supply voltage.

According to some implementations, an image sensor device includes a control circuit that outputs a first control signal and a clamp selection signal, a row decoder that outputs a reset signal, a transfer signal, and a selection signal based on the first control signal, a pixel that operates in response to the reset signal, the transfer signal, and the selection signal such that a first pixel signal is output to a first column line during a first time period and a second pixel signal is output to the first column line during a second time period, and a clamp circuit that outputs a first clamp signal to the first column line during the first time period. The pixel includes a photodiode that integrates charges in response to a light signal, a transfer transistor that is connected between the photodiode and a floating diffusion node and operates in response to the transfer signal, a reset transistor that is connected between a first power supply voltage and the floating diffusion node and operates in response to the reset signal, a drive transistor that is connected between the first power supply voltage and a 0-th node and operates in response to a voltage of the floating diffusion node, and a select transistor that is connected between the 0-th node and the first column line and operates in response to the selection signal. The clamp circuit includes a clamp transistor that is connected between a second power supply voltage and a first node and operates in response to a clamp control signal, and a clamp select transistor that is connected between the first node and the first column line and operates in response to the clamp selection signal. Wherein the second power supply voltage is lower than the first power supply voltage.

According to some implementations, an image sensor device includes a pixel that outputs a first pixel signal to a first column line during a first time period and outputs a second pixel signal to the first column line during a second time period, and a clamp circuit that outputs a first clamp signal to the first column line during the first time period. During the first time period, a voltage of the first column line is determined based on the first pixel signal and the first clamp signal. The pixel and the clamp circuit operate based on a first power supply voltage, a voltage of the first clamp signal is determined based on a voltage of a clamp control signal, and the voltage of the clamp control signal is higher than the first power supply voltage.

BRIEF DESCRIPTION OF THE FIGURES

The above and other objects and features of the present disclosure will become apparent by describing in detail implementations thereof with reference to the accompanying drawings.

DETAILED DESCRIPTION

Below, implementations of the present disclosure will be described in detail and clearly to such an extent that one skilled in the art easily carries out the present disclosure.

In the specification, function blocks of drawings, which respectively correspond to the terms "block", "unit", "logic", etc., may be implemented in the form of software, hardware, or a combination thereof.

Figure 1:
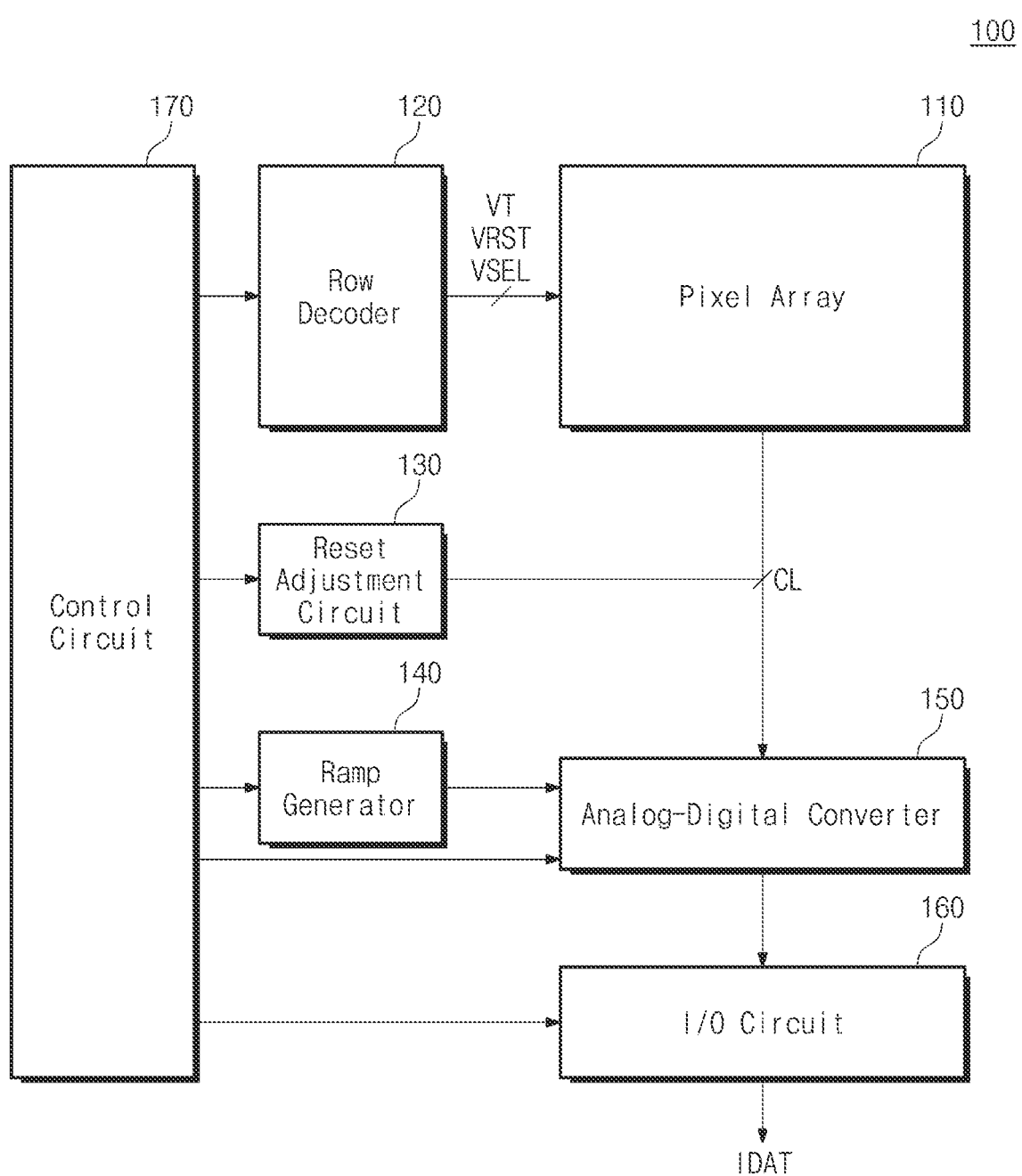
FIG. 1 is a block diagram illustrating an image sensor device according to some implementations of the present disclosure.

FIG. 1 is a block diagram illustrating an image sensor device according to some implementations of the present disclosure. Referring to FIG. 1, an image sensor device 100 may include a pixel array 110, a row decoder 120, a reset adjustment circuit 130, a ramp generator 140, an analog-to-digital converter 150, an input/output (I/O) circuit 160, and a control circuit 170.

The pixel array 110 may include a plurality of pixels arranged in a row direction and a column direction. Each of the plurality of pixels may generate a pixel signal under control of the row decoder 120. The plurality of pixels may output the pixel signals through column lines CL.

The row decoder 120 may select and drive a row of the pixel array 110. The row decoder 120 may be connected to the pixel array 110 through a plurality of signal lines. The row decoder 120 may decode addresses generated by the control circuit 170 and may generate control signals for selecting and driving a row of the pixel array 110. The row decoder 120 may provide the control signals to the plurality of pixels through the plurality of signal lines. For example, the control signals may include a transfer signal VT, a selection signal VSEL, a reset signal VRST, etc.

The reset adjustment circuit 130 may be connected to the column lines CL. When the pixel signal for the reset sampling operation is output, the reset adjustment circuit 130 may adjust, maintain, and control voltage levels of the column lines CL so as not to decrease to a specific level or lower.

The ramp generator 140 may generate a ramp signal under control of the control circuit 170. For example, the ramp generator 140 may operate in response to a control signal such as a ramp enable signal. When the ramp enable signal is activated, the ramp generator 140 may generate the ramp signal depending on preset values (e.g., a start level, an end level, and a slope). In other words, the ramp signal may be a signal that increases or decreases along a preset slope during a specific time. The ramp signal may be provided to the analog-to-digital converter 150.

The analog-to-digital converter 150 may receive column output signals through the column lines CL and may receive the ramp signal from the ramp generator 140. The analog-to-digital converter 150 may sample a signal (e.g., an analog signal) output through each of the column lines CL so as to be converted into a digital signal. For example, the analog-to-digital converter 150 may perform the reset sampling operation and the pixel sampling operation and may output a difference between a result value of the reset sampling operation and a result value of the pixel sampling operation as a pixel value (e.g., a digital signal).

The I/O circuit 160 may receive the digital signals from the analog-to-digital converter 150. The I/O circuit 160 may combine the received digital signals to output final image data IDAT.

The control circuit 170 may control the row decoder 120, the reset adjustment circuit 130, the ramp generator 140, the analog-to-digital converter 150, and the I/O circuit 160.

Figure 2:
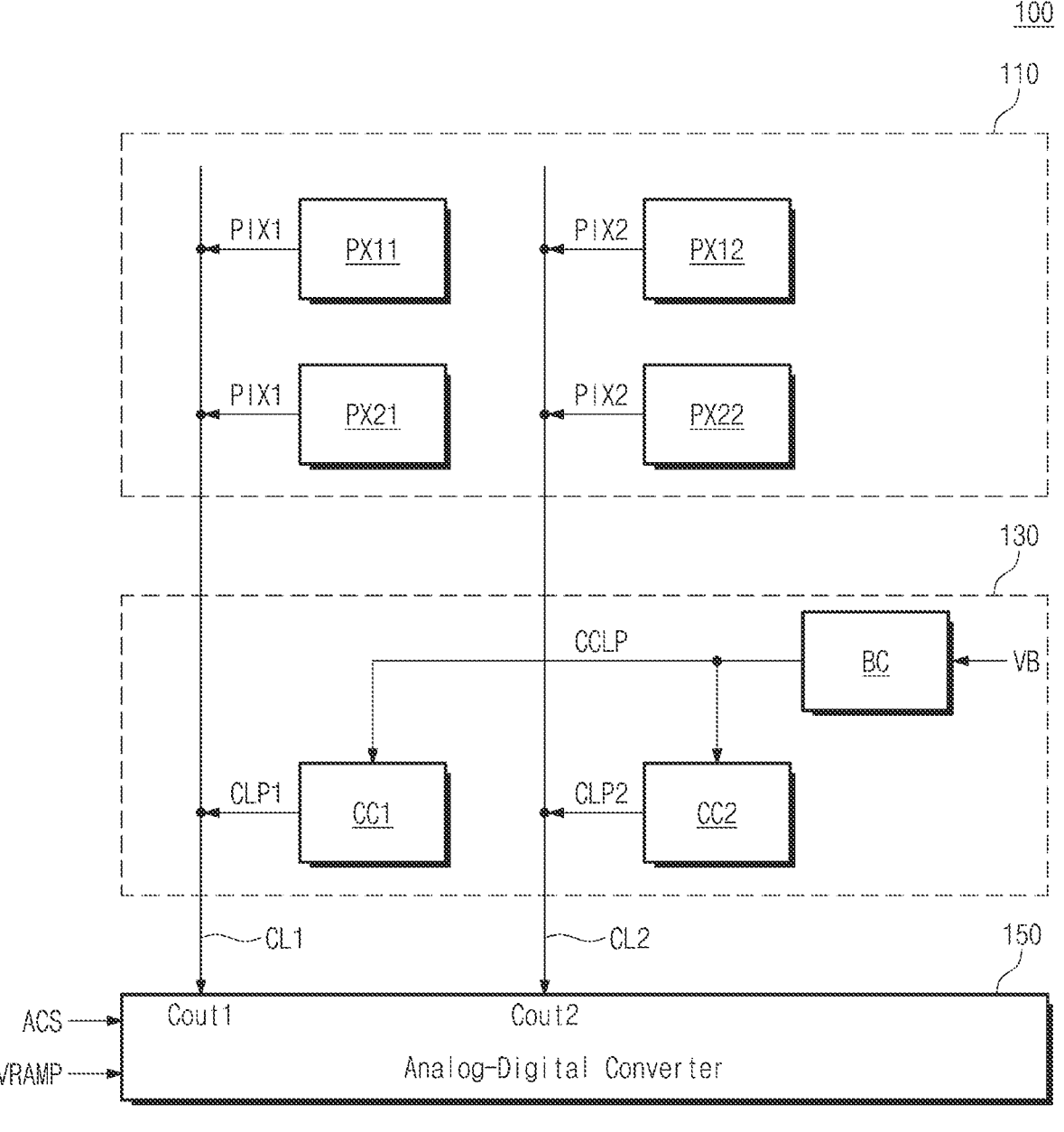
FIG. 2 is a diagram illustrating a partial configuration of an image sensor device of FIG. 1 in detail.

FIG. 2 is a diagram illustrating a partial configuration of an image sensor device of FIG. 1 in detail. For brevity of drawing and for convenience of description, a partial configuration of the image sensor device 100 is illustrated, but the present disclosure is not limited thereto. Also, an example in which a plurality of pixels PX11 to PX22 of the pixel array 110 are disposed at the first and second rows and first and second columns is illustrated, but the present disclosure is not limited thereto. For example, a plurality of pixels of the pixel array 110 may be expanded in the row direction and the column direction, and thus, pixels may be further included in the pixel array 110.

Referring to FIGS. 1 and 2, the image sensor device 100 may include the pixel array 110, the reset adjustment circuit 130, and the analog-to-digital converter 150. The pixel array 110 may include the plurality of pixels PX11 to PX22. The pixels PX11 and PX21 located at the first column from among the plurality of pixels PX11 to PX22 may be connected to the first column line CL1, and the pixels PX12 and PX22 located at the second column from among the plurality of pixels PX11 to PX22 may be connected to the second column line CL2.

In some implementations, the pixel array 110 may include various forms of color filter arrays. For example, the pixel array 110 may include a color filter array configured to allow each pixel to receive a light signal corresponding to a preset color. In some implementations, the color filter array may include at least one of various color filter array patterns such as a Bayer pattern, an RGBE pattern, a CYYM pattern, a CYGM pattern, a BGBW Bayer pattern, a BGBW pattern, and a tetra pattern.

The plurality of pixels PX11 to PX22 may generate first and second pixel signals PIX1 and PIX2. For example, the pixels PX11 and PX21 located at the first column from among the plurality of pixels PX11 to PX22 may generate the first pixel signals PIX1, and the pixels PX12 and PX22 located at the second column from among the plurality of pixels PX11 to PX22 may generate the second pixel signals PIX2.

The plurality of pixels PX11 to PX22 may output the first and second pixel signals PIX1 and PIX2 to the first and second column lines CL1 and CL2 in response to the selection signal VSEL.

In some implementations, the voltage of each of the first and second pixel signals PIX1 and PIX2 may be a voltage generated through the reset operation of the corresponding pixel or a voltage generated through the integration operation.

The reset adjustment circuit 130 may include a plurality of clamp circuits CC1 and CC2 and a bias circuit BC. The plurality of clamp circuits CC1 and CC2 may be connected to the corresponding column lines CL1 and CL2. For brevity of drawing and for convenience of description, the reset adjustment circuit 130 of FIG. 2 may include two clamp circuits CC1 and CC2, but the present disclosure is not limited thereto. For example, the reset adjustment circuit 130 may include clamp circuits CC, the number of which is equal to the number of column lines CL.

The bias circuit BC may receive a bias signal VB from the control circuit 170. The bias circuit BC may output a clamp control signal CCLP based on the bias signal VB.

The clamp circuits CC1 and CC2 may be respectively connected to the corresponding column lines CL1 and CL2. For example, the first clamp circuit CC1 may be connected to the first column line CL1, and the second clamp circuit CC2 may be connected to the second column line CL2. When the pixel signals PIX1 and PIX2 for the reset sampling operation are output, the clamp circuits CC1 and CC2 may output clamp signals CLP1 and CLP2 to the column lines CL1 and CL2. For example, the first clamp circuit CC1 may output the first clamp signal CLP1 to the first column line CL1, and the second clamp circuit CC2 may output the second clamp signal CLP2 to the second column line CL2.

The column lines CL1 and CL2 may output column output signals Cout1 and Cout2 to the analog-to-digital converter 150. For example, when the reset sampling operation is performed, voltages of the column output signals Cout1 and Cout2 may be voltages of the pixel signals PIX1 and PIX2 or the clamp signals CLP1 and CLP2. For example, when the pixel sampling operation is performed, voltages of the column output signals Cout1 and Cout2 may be voltages of the pixel signals PIX1 and PIX2.

In detail, in the reset sampling operation, when the voltage of the first pixel signal PIX1 is higher than the voltage of the first clamp signal CLP1, the voltage of the first column output signal Cout1 may be the voltage of the first pixel signal PIX1. For example, in the reset sampling operation, when the voltage of the first pixel signal PIX1 is lower than the voltage of the first clamp signal CLP1, the voltage of the first column output signal Cout1 may be the voltage of the first clamp signal CLP1. According to the above description, the reset adjustment circuit 130 may prevent the voltages of the column lines CL1 and CL2 from decreasing to a given level or lower when the reset sampling operation is performed. The operation of the reset adjustment circuit 130 will be described in detail later.

The analog-to-digital converter 150 may be connected to the first and second column lines CL1 and CL2. The analog-to-digital converter 150 may receive the first and second column output signals Cout1 and Cout2 from the first and second column lines CL1 and CL2, respectively. The analog-to-digital converter 150 may receive a ramp signal VRAMP from the ramp generator 140.

The analog-to-digital converter 150 may sample the first and second column output signals Cout1 and Cout2 in response to a control signal ACS from the control circuit 170 (e.g., may perform digital signal conversion).

In detail, the analog-to-digital converter 150 may perform the reset sampling operation and the pixel sampling operation in response to the control signal ACS from the control circuit 170. The analog-to-digital converter 150 may obtain the reset voltage through the reset sampling operation and may obtain the data voltage through the pixel sampling operation. The reset voltage may refer to a voltage of the ramp signal VRAMP, which is equal to voltages of the column output signals (e.g., Cout1 and Cout2) after the reset operation is performed. The data voltage may refer to a voltage of the ramp signal VRAMP, which is equal to voltages of the column output signals (e.g., Cout1, Cout2) after the integration operation is performed. The analog-to-digital converter 150 may generate a digital signal for an image based on a difference between the data voltage and the reset voltage.

Figure 3:
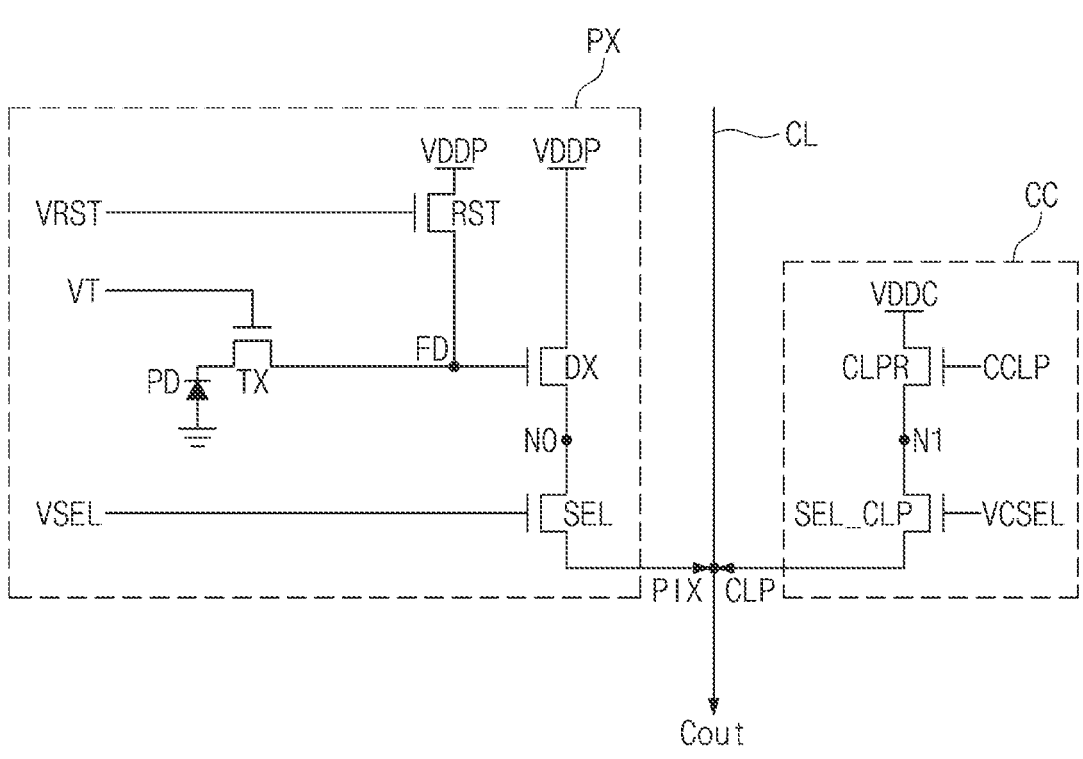
FIG. 3 is a circuit diagram illustrating an example of a pixel and a clamp circuit of FIG. 2.

FIG. 3 is a circuit diagram illustrating an example of a pixel and a clamp circuit of FIG. 2. A pixel of a 4TR-1PD (4-transistor, 1-photodiode) structure will be described with reference to FIG. 3. However, the present disclosure is not limited thereto. For example, pixels included in the pixel array 110 may be implemented in various other forms.

Referring to FIGS. 1 and 3, the pixel PX may output a pixel signal PIX to the column line CL in response to the reset signal VRST, the transfer signal VT, and the selection signal VSEL from the row decoder 120.

For example, the pixel PX may include a transfer transistor TX, a photodiode PD, a reset transistor RST, a drive transistor DX, and a select transistor SEL.

The photodiode PD may be configured to integrate (or accumulate) charges in response to a light signal received from the outside. The transfer transistor TX may be connected between the photodiode PD and a floating diffusion node FD. The transfer transistor TX may operate in response to the transfer signal VT from the row decoder 120. For example, the transfer transistor TX may be turned on in response to the transfer signal VT of the logic high level. While the transfer transistor TX is turned on in response to the transfer signal VT of the logic high level, the charges may be transferred from the photodiode PD to the floating diffusion node FD. As such, the voltage level of the floating diffusion node FD may decrease.

The reset transistor RST may be connected between a pixel power supply voltage VDDP and the floating diffusion node FD. The reset transistor RST may operate in response to the reset signal VRST from the row decoder 120. For example, the reset transistor RST may be turned on in response to the reset signal VRST of the logic high level. While the reset transistor RST is turned on in response to the reset signal VRST of the logic high level, the floating diffusion node FD may be reset. As such, the floating diffusion node FD may be charged with the pixel power supply voltage VDDP.

The drive transistor DX may be connected between the pixel power supply voltage VDDP and a 0-th node NO. The drive transistor DX may operate in response to the voltage of the floating diffusion node FD. For example, the gate terminal of the drive transistor DX may be connected to the floating diffusion node FD. In this case, the drive transistor DX may be configured to transfer the pixel signal PIX corresponding to the variation in the voltage of the floating diffusion node FD to the select transistor SEL through the 0-th node NO. That is, the drive transistor DX may operate as a source follower whose input terminal is connected to the floating diffusion node FD. The voltage level of the pixel signal PIX may be determined based on the voltage level of the floating diffusion node FD.

The select transistor SEL may be connected between the 0-th node NO and the column line CL. The select transistor SEL may operate in response to the selection signal VSEL from the row decoder 120. For example, the select transistor SEL may transfer the pixel signal PIX from the drive transistor DX to the column line CL in response to the selection signal VSEL of the logic high level.

In some implementations, an operation of transferring the voltage of the floating diffusion node FD to the column line CL through the drive transistor DX and the select transistor SEL such that the pixel signal PIX is output may be referred to as a "readout operation." Also, an operation of turning on and turning off the transfer transistor TX such that the voltage of the floating diffusion node FD is decreased by the charges received from the photodiode PD may be referred to as an "integration operation." Also, an operation of charging the floating diffusion node FD with the pixel power supply voltage VDDP through the reset transistor RST may be referred to as a "reset operation."

The clamp circuit CC may output the clamp signal CLP to the column line CL based on the clamp control signal CCLP and a clamp selection signal VCSEL. The clamp circuit CC may include a clamp transistor CLPR and a clamp select transistor SEL_CLP.

The clamp transistor CLPR may be connected between a clamp power supply voltage VDDC and a first node N1. The clamp transistor CLPR may operate in response to the clamp control signal CCLP from the bias circuit BC (refer to FIG. 2). For example, the clamp transistor CLPR may be turned on in response to the clamp control signal CCLP of the logic high level.

The clamp select transistor SEL_CLP may be connected between the first node N1 and the column line CL. The clamp select transistor SEL_CLP may operate in response to the clamp selection signal VCSEL from the control circuit 170. For example, the clamp select transistor SEL_CLP may be turned on in response to the clamp selection signal VCSEL of the logic high level.

When both the clamp transistor CLPR and the clamp select transistor SEL_CLP are turned on, the clamp transistor CLPR may be configured to transfer the clamp control signal CCLP to the clamp select transistor SEL_CLP through the first node N1. That is, the clamp transistor CLPR may operate as a source follower whose input terminal is connected to the bias circuit BC. For example, the voltage of the clamp signal CLP may be determined based on the voltage of the clamp control signal CCLP.

For example, the select transistor SEL, the clamp transistor CLPR, and the clamp select transistor SEL_CLP may be turned on. In this case, because the pixel PX and the clamp circuit CC are connected to the column line CL in parallel, the voltage of the column output signal Cout output through the column line CL may be determined based on voltages of the pixel signal PIX and the clamp signal CLP.

For example, when the voltage of the pixel signal PIX is higher than the voltage of the clamp signal CLP, the voltage of the column output signal Cout may be determined based on the voltage of the pixel signal PIX. For example, when the voltage of the pixel signal PIX is lower than the voltage of the clamp signal CLP, the voltage of the column output signal Cout may be determined based on the voltage of the clamp signal CLP.

In other words, when both the clamp transistor CLPR and the clamp select transistor SEL_CLP are turned on, the voltage of the column output signal Cout output through the column line CL may be a voltage having a higher voltage level from among the voltages of the pixel signal PIX and the clamp signal CLP. That is, the pixel PX and the reset adjustment circuit 130 may operate with a winner take all characteristic.

For example, the voltage of the floating diffusion node FD may be excessively smaller than a target voltage. As such, the voltage of the pixel signal PIX may excessively decrease. In this case, the voltage of the column output signal Cout may be determined based on the voltage of the clamp signal CLP. That is, the clamp circuit CC may adjust the voltage of the column line CL based on the voltage of the clamp control signal CCLP, so as not to decrease to a specific level or lower. The operation of the clamp circuit CC will be described in detail with reference to the following drawings.

In some implementations, immediately after the reset operation is performed, the read operation may be performed to perform the reset sampling operation. In the read operation, immediately after the select transistor SEL is turned on, the voltage of the column output signal Cout may be determined based on the pixel signal PIX. In this case, the voltage of the pixel signal PIX may be determined based on the voltage level of the floating diffusion node FD. The floating diffusion node FD may be in a state of being reset by the reset operation. That is, the voltage of the floating diffusion node FD may be the reset voltage that is set based on the pixel power supply voltage VDDP. Accordingly, immediately after the select transistor SEL is turned on to perform the reset sampling operation, the voltage level of the column output signal Cout may be determined based on the voltage of the floating diffusion node FD. For convenience of description, the voltage of the column output signal Cout, which is established immediately after the select transistor SEL is turned on to perform the reset sampling operation, may be referred to as a "reference voltage."

Figure 4A:
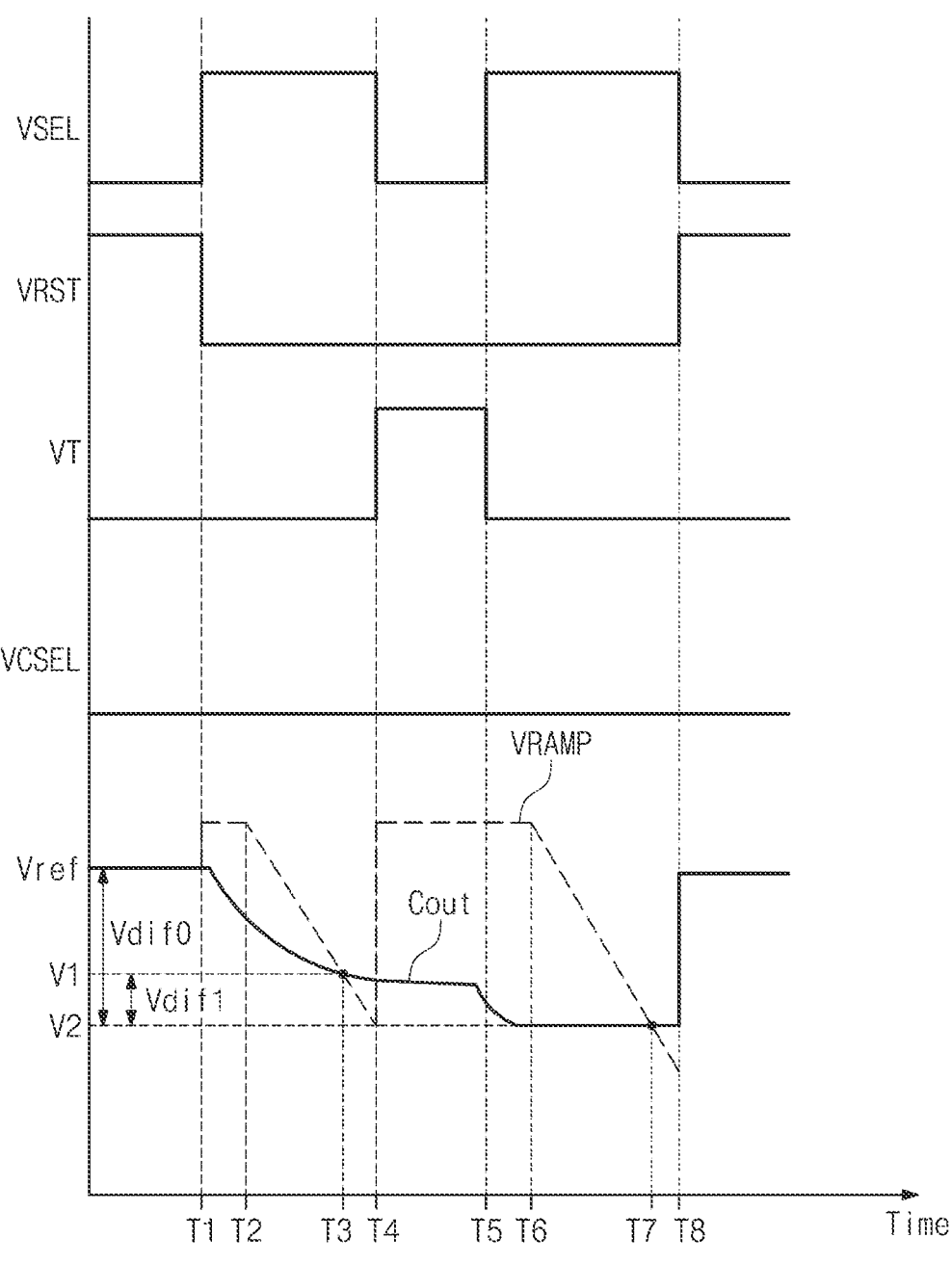
FIG. 4A is a timing diagram for describing a sun spot phenomenon.
Figure 4B:
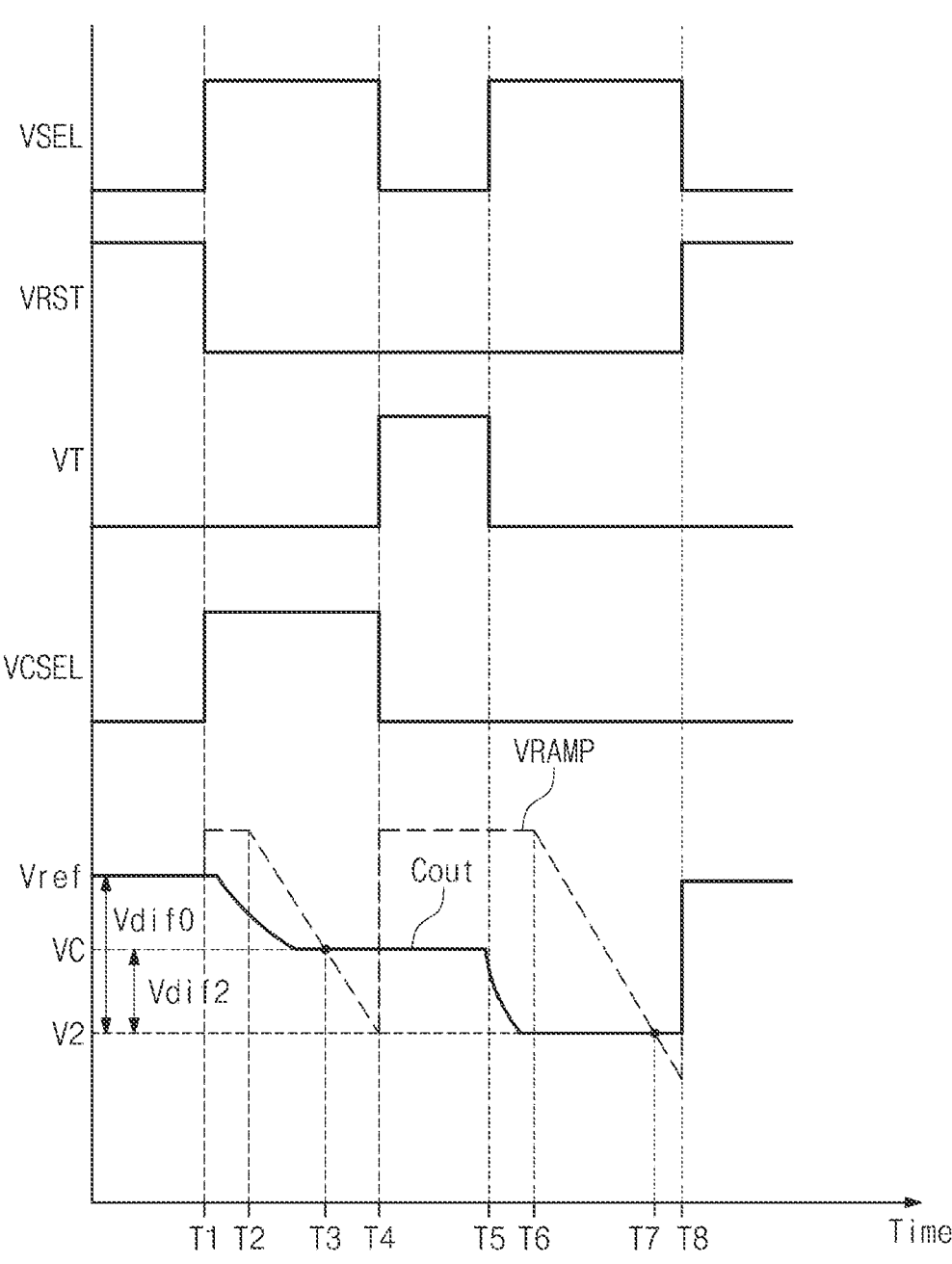
FIG. 4B is a timing diagram for describing an operation of a clamp circuit.

FIG. 4A is a timing diagram for describing a sun spot phenomenon, and FIG. 4B is a timing diagram for describing an operation of a clamp circuit. In the graphs of FIGS. 4A and 4B, a horizontal axis represents a time. FIGS. 4A and 4B will be described with reference to FIGS. 1 to 3.

For example, in time periods illustrated in FIGS. 4A and 4B, the clamp control signal CCLP may be at the logic high level. In FIGS. 4A and 4B, it is assumed that the voltage level of the pixel power supply voltage VDDP of FIG. 3 is equal to the voltage level of the clamp power supply voltage VDDC of FIG. 3. Also, in FIGS. 4A and 4B, it is assumed that the clamp transistor CLPR operates in a saturation region when the clamp transistor CLPR is turned on.

Referring to FIG. 4A, the clamp selection signal VCSEL may always be at the logic low level in the time period illustrated in FIG. 4A. This means that the clamp select transistor SEL_CLP is turned off in the time period illustrated in FIG. 4A. As such, in the time period illustrated in FIG. 4A, the clamp circuit CC may fail to perform the operation of adjusting the voltage level of the column lines CL.

Referring to FIG. 4A, before the first point in time T1, as the reset signal VRST is maintained at the logic high level and the transfer signal VT and the selection signal VSEL is maintained at the logic low level, the transfer transistor TX and the selection signal VSEL may be turned off, and the reset transistor RST may be turned on. In this case, the pixel PX may perform the reset operation. That is, the floating diffusion node FD of the pixel PX may be charged based on the pixel power supply voltage VDDP.

For example, the reset sampling operation may be performed in a time period from T1 to T4. At the first point in time T1, the select transistor SEL may be turned on in response to the selection signal VSEL of the logic high level. Also, to perform the reset sampling operation, an offset may be applied to the ramp signal VRAMP, and the ramp signal VRAMP may decrease from the second point in time T2.

For example, as the select transistor SEL is turned on, the voltage of the column output signal Cout may be determined based on the voltage of the pixel signal PIX. Accordingly, the voltage of the column output signal Cout may be a reference voltage Vref immediately after the first point in time T1.

In some implementations, the intensity of light incident onto the pixel PX may be excessively high. In this case, the amount of charges that the photodiode PD generates may be excessively high. Even though the transfer transistor TX is turned off, the charges generated by the photodiode PD may move to the floating diffusion node FD. This means that even though the transfer transistor TX is turned off, the voltage of the floating diffusion node FD decreases.

According to the above description, even though the transfer transistor TX is turned off, the voltage of the floating diffusion node FD may decrease during the time period from T1 to T4. Accordingly, the voltage of the pixel signal PIX may decrease. Because the clamp select transistor SEL_CLP is turned off, the voltage of the column output signal Cout may be equal to the voltage of the pixel signal PIX. That is, as the voltage of the pixel signal PIX decreases, the voltage of the column output signal Cout may decrease.

In this case, at the third point in time T3, the voltage of the ramp signal VRAMP may be equal to the voltage of the column output signal Cout. The voltage of the column output signal Cout at the third point in time T3 may be a first voltage V1. Accordingly, the voltage level of the reset voltage may be the first voltage V1 and may be lower than the reference voltage Vref.

At the fourth point in time T4, an offset may be again applied to the ramp signal VRAMP.

Also, during the time period from T4 to T5, the transfer signal VT may be at the logic high level, and the selection signal VSEL may be at the logic low level. The transfer transistor TX may be turned on in response to the transfer signal VT of the logic high level, and thus, charges generated by the photodiode PD may move to the floating diffusion node FD. As such, the voltage of the floating diffusion node FD may decrease. The select transistor SEL may be turned off in response to the selection signal VSEL of the logic low level. That is, the pixel PX may perform the integration operation.

For example, the pixel sampling operation may be performed in the time period from T5 to T8.

At the fifth point in time T5, as the transfer signal VT transitions to the logic low level and the selection signal VSEL transitions to the logic high level, the transfer transistor TX may be turned off, and the select transistor SEL may be turned on. Accordingly, after the fifth point in time T5, the voltage of the pixel signal PIX may decrease based on the amount of charges of the floating diffusion node FD. That is, the voltage of the column output signal Cout may decrease based on the voltage of the pixel signal PIX. At the sixth point in time T6, the voltage of the ramp signal VRAMP may decrease to perform the pixel sampling operation.

At the seventh point in time T7, the voltage of the ramp signal VRAMP may be equal to the voltage of the column output signal Cout. The voltage level of the column output signal Cout at the seventh point in time T7 may be a second voltage V2. Accordingly, the voltage level of the data voltage may be the second voltage V2.

At the eighth point in time T8, as the selection signal VSEL transitions to the logic low level and the reset signal VRST transitions to the logic high level, the select transistor SEL may be turned off, and the reset transistor RST may be turned on. As such, the floating diffusion node FD may be reset.

For example, the analog-to-digital converter 150 may generate a digital signal for an image based on a difference between the reset voltage and the data voltage. The reset voltage may be obtained by the reset sampling operation, and the data voltage may be obtained by the pixel sampling operation. In the case where a difference between the reset voltage and the data voltage is high, the analog-to-digital converter 150 may generate the digital signal including information indicating that the intensity of light incident onto the pixel PX is high.

For example, unlike the example illustrated in FIG. 4A, the intensity of light incident onto the pixel PX may not be excessively high. In this case, in the time period (e.g., from T1 to T4) where the reset sampling operation is performed, because the transfer transistor TX is turned off, the voltage level of the floating diffusion node FD may not decrease. In this case, in the time period (e.g., from T1 to T4) where the reset sampling operation is performed, the voltage level of the column output signal Cout may be maintained at the reference voltage Vref. Accordingly, the voltage level of the reset voltage may be the reference voltage Vref. In this case, the analog-to-digital converter 150 may generate the digital signal based on a difference Vdif0 between the reference voltage Vref and the voltage level V2 of the data voltage.

As illustrated in FIG. 4A, when the intensity of light incident onto the pixel PX is excessively high, the voltage level V1 of the reset voltage may be excessively lower than the reference voltage Vref. Accordingly, a difference Vdif1 between the voltage level V1 of the reset voltage and the voltage level V2 of the data voltage may be markedly smaller than the difference Vdif0 between the reference voltage Vref and the voltage level V2 of the data voltage. In this case, even though the intensity of light incident onto the pixel PX is high, the analog-to-digital converter 150 may generate the digital signal including abnormal information indicating that the intensity of light incident onto the pixel PX is small.

When the analog-to-digital converter 150 outputs the digital signal including the abnormal information, the image sensor device 100 may fail to recognize an image properly. For example, as described above, the phenomenon that the image sensor device 100 fails to recognize an image properly in the environment where the intensity of light incident onto the pixel PX is high may be referred to as a "sun spot phenomenon."

Unlike the case of FIG. 4A, referring to FIG. 4B, the clamp selection signal VCSEL may be maintained at the logic high level in the time period from T1 to T4. Accordingly, the clamp transistor CLPR and the clamp select transistor SEL_CLP may be turned on in the time period from T1 to T4. In this case, in the time period from T1 to T4, the clamp circuit CC may output the clamp signal CLP to the column line CL. The voltage level of the clamp signal CLP may be a clamp voltage VC. The clamp voltage VC may be determined based on the voltage of the clamp control signal CCLP.

In the time period from T1 to T8, the selection signal VSEL, the reset signal VRST, and the transfer signal VT may have the same logic levels as described with reference to FIG. 4A. Accordingly, a difference between the case where the clamp select transistor SEL_CLP is turned off and the case where the clamp select transistor SEL_CLP is turned on will be mainly described. In FIG. 4B, as described with reference to FIG. 4A, it is assumed that the intensity of light incident onto the pixel PX is excessively high. However, the present disclosure is not limited thereto.

After the first point in time T1, the intensity of light incident onto the pixel PX may be excessively high. In this case, even the transfer transistor TX is turned off, the charges generated by the photodiode PD may move to the floating diffusion node FD. This means that even though the transfer transistor TX is turned off, the voltage of the floating diffusion node FD decreases. Accordingly, the voltage of the pixel signal PIX that the pixel PX outputs through the column line CL may decrease.

However, unlike the case of FIG. 4A, in the time period from T1 to T4 of FIG. 4B, the clamp circuit CC may adjust the voltage of the column line CL. In detail, when the voltage of the pixel signal PIX is lower than the clamp voltage VC, the voltage of the column output signal Cout may be the clamp voltage VC. In this case, unlike the case of FIG. 4A, the voltage of the column output signal Cout may decrease only to the clamp voltage VC. The clamp voltage VC may be higher than the voltage level V1 of the reset voltage of FIG. 4A.

In this case, at the third point in time T3, the voltage of the ramp signal VRAMP may be equal to the voltage of the column output signal Cout. The voltage of the column output signal Cout at the third point in time T3 may be the clamp voltage VC. That is, the voltage level of the reset voltage may be the clamp voltage VC.

Afterwards, at the fourth point in time T4, as the selection signal VSEL and the clamp selection signal VCSEL transition to the logic low level, the select transistor SEL and the clamp select transistor SEL_CLP may be turned off. Also, an offset may be again applied to the ramp signal VRAMP.

Operations in the time period from T5 to T8 are similar to the operations described with reference to FIG. 4A. At the seventh point in time T7, the voltage of the ramp signal VRAMP may be equal to the voltage of the column output signal Cout. The voltage of the column output signal Cout at the seventh point in time T7 may be the second voltage V2. That is, the voltage level of the data voltage may be the second voltage V2.

In this case, a difference Vdif2 between the voltage level VC of the reset voltage and the voltage level V2 of the data voltage may increase compared to the case (e.g., Vdif1) of FIG. 4A. Accordingly, the reset adjustment circuit 130 may attenuate the sun spot phenomenon. As a difference between the reference voltage Vref and the clamp voltage VC becomes smaller, the degree to which the reset adjustment circuit 130 attenuates the sun spot phenomenon may increase. The clamp voltage VC may be determined based on the voltage of the clamp control signal CCLP. Accordingly, as the voltage level of the clamp control signal CCLP becomes higher, the degree at which the reset adjustment circuit 130 attenuates the sun spot phenomenon may increase.

The timing of signals associated with the operation of the image sensor device 100 is described with reference to FIGS. 4A and 4B, but the present disclosure is not limited thereto. For example, the timing of signals may be changed or modified depending on the way to implement.

Figure 5A:
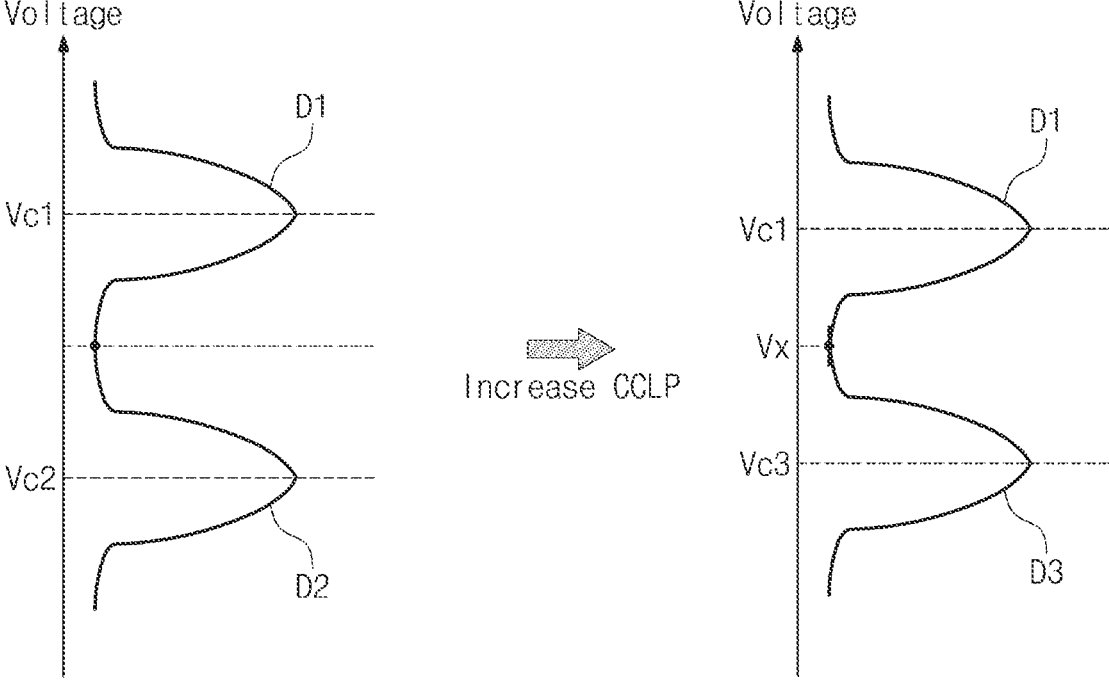
FIG. 5A is a graph for describing the influence of a threshold voltage characteristic on a voltage of a column output signal.
Figure 5B:
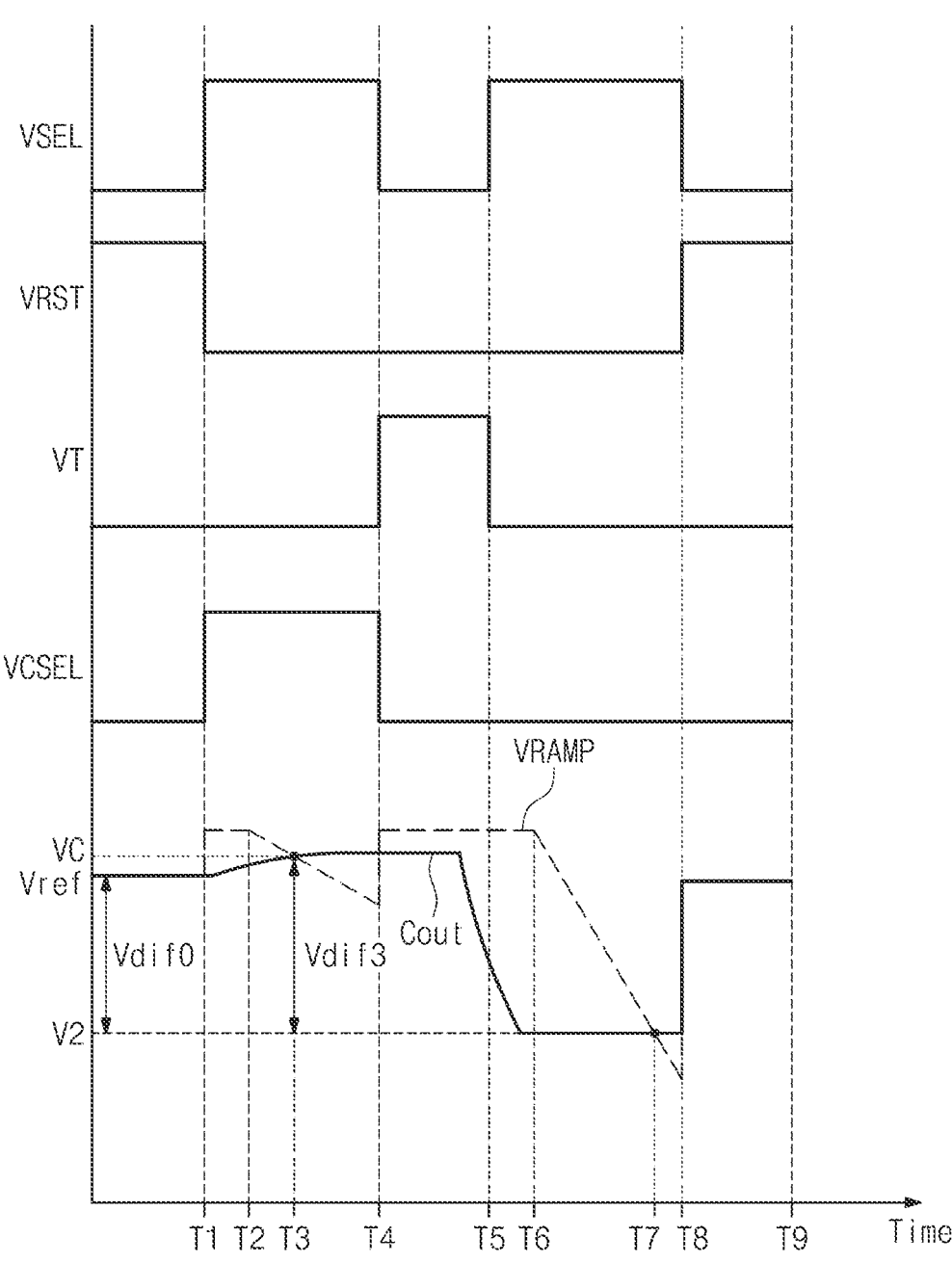
FIG. 5B is a graph for describing the influence of a voltage of a clamp control signal on a voltage of a column output signal.

FIG. 5A is a graph for describing the influence of a threshold voltage characteristic on a voltage of a column output signal, and FIG. 5B is a graph for describing the influence of a voltage of a clamp control signal on a voltage of a column output signal. FIGS. 5A and 5B will be described with reference to FIGS. 1 to 4B. In the graphs of FIG. 5A, a vertical axis represents a voltage. In the graphs of FIGS. 5B, a horizontal axis represents a time.

The description will be described with reference to FIGS. 3 and 5A under the condition that the reset transistor RST and the transfer transistor TX are turned off, the select transistor SEL is turned on, and the floating diffusion node FD is reset based on the pixel power supply voltage VDDP. A voltage distribution of the floating diffusion node FD may be determined based on the pixel power supply voltage VDDP and a threshold voltage distribution of the reset transistor RST. The voltage level of the pixel signal PIX may be determined based on the voltage level of the floating diffusion node FD. In this case, the pixel signal PIX may have a first voltage distribution D1 based on the voltage level of the floating diffusion node FD. For example, the first voltage distribution D1 may have the Gaussian distribution shape formed with respect to a first center voltage Vc1.

As described above, the voltage of the column output signal Cout, which is established immediately after the select transistor SEL is turned on to perform the reset sampling operation, may be referred to as a "reference voltage." Immediately after the select transistor SEL is turned on to perform the reset sampling operation, the column output signal Cout may have the first voltage distribution D1. Accordingly, the first voltage distribution D1 may mean the voltage distribution of the reference voltage.

Also, when the clamp transistor CLPR and the clamp select transistor SEL_CLP are turned on and the voltage of the clamp control signal CCLP is sufficiently lower than the voltage level of the pixel power supply voltage VDDP, the clamp signal CLP may have a second voltage distribution D2. The second voltage distribution D2 may be determined based on a threshold voltage distribution of the clamp transistor CLPR and the voltage of the clamp control signal CCLP. For example, the second voltage distribution D2 may have the Gaussian distribution shape formed with respect to a second center voltage Vc2.

When the voltage level of the clamp control signal CCLP is sufficiently lower than the voltage level of the pixel power supply voltage VDDP, the voltage of the clamp signal CLP having the second voltage distribution D2 may be always lower than the voltage of the pixel signal PIX having the first voltage distribution D1. Because the voltage of the column output signal Cout is a voltage having a higher level from among the voltage of the pixel signal PIX and the voltage of the clamp signal CLP, the voltage of the column output signal Cout may not become higher than the reference voltage by the reset adjustment circuit 130.

However, as described with reference to FIG. 4B, as the voltage level VC (refer to FIG. 4B) of the clamp signal CLP becomes closer to the reference voltage Vref (refer to FIG. 4B), the degree to which the sun spot phenomenon is removed may increase. The voltage level VC (refer to FIG. 4B) of the clamp signal CLP may be determined based on the voltage of the clamp control signal CCLP. When the voltage of the clamp control signal CCLP increases to improve the performance of removing the sun spot phenomenon, the clamp signal CLP may have a third voltage distribution D3. For example, the third voltage distribution D3 may have the Gaussian distribution shape formed with respect to a third center voltage Vc3.

In this case, the first voltage distribution D1 and the third voltage distribution D3 may overlap each other with respect to a specific voltage Vx. For example, the voltage of the pixel signal PIX may be lower than or equal to the specific voltage Vx, and the voltage of the clamp signal CLP may be higher than or equal to the specific voltage Vx. In this case, even though an excessively strong light is not incident onto the pixel PX, the voltage of the column output signal Cout may be the voltage of clamp signal CLP. In this case, while the reset sampling operation is performed, the voltage of the column output signal Cout may be higher than the reference voltage (e.g., Vref in FIGS. 4A and 4B).

In FIG. 5B, in the time period from T1 to T8, the selection signal VSEL, the reset signal VRST, the transfer signal VT, the clamp control signal CCLP, and the clamp selection signal VCSEL may have the same logic levels as described with reference to FIG. 4B. In FIG. 5B, it is assumed that, during the time period from T1 to T4, the voltage distribution of the pixel signal PIX is equal to the first voltage distribution D1 of FIG. 5A and the voltage distribution of the clamp signal CLP is equal to the third voltage distribution D3 of FIG. 5A. That is, it is assumed that, in the time period (e.g., from T1 to T4) where the reset sampling operation is performed, there is a portion where the voltage distribution D3 of the clamp signal CLP and the voltage distribution D1 of the pixel signal PIX overlap each other.

Before the first point in time T1, the reset transistor RST may be turned on in response to the reset signal VRST of the logic high level, and thus the floating diffusion node FD may be reset with the pixel power supply voltage VDDP. In this case, the voltage of the floating diffusion node FD may be the reference voltage Vref. In some implementations, the reference voltage Vref may be lower than the specific voltage Vx (refer to FIG. 5A). Also, the voltage of the column output signal Cout may be the reference voltage Vref.

The reset sampling operation may be performed in the time period from T1 to T4. While the reset sampling operation is performed, the pixel PX may output the pixel signal PIX of the reference voltage Vref to the column line CL in response to the selection signal VSEL of the logic high level. The clamp circuit CC may output the clamp signal CLP of the clamp voltage VC to the column line CL in response on the clamp control signal CCLP of the logic high level and the clamp selection signal VCSEL of the logic high level. In this case, the clamp voltage VC may be higher than the specific voltage Vx (refer to FIG. 5A). That is, the voltage of the column output signal Cout may be the clamp voltage VC.

At the third point in time T3, the voltage of the column output signal Cout may be equal to the voltage of the ramp signal VRAMP. That is, the voltage level of the reset voltage may be the clamp voltage VC.

In this case, a difference Vdif3 between the voltage level VC of the reset voltage and the voltage level V2 of the data voltage may increase compared to the case (e.g., Vdif1) of FIG. 4A. Accordingly, the reset adjustment circuit 130 may attenuate the sun spot phenomenon.

Accordingly, the difference Vdif3 between the voltage level VC of the reset voltage and the voltage level V2 of the data voltage may be greater than the difference Vdif0 between the reference voltage Vref and the voltage level V2 of the data voltage. When the voltage level VC of the reset voltage is higher than the reference voltage Vref, a column fixed pattern noise may be caused.

As described with reference to FIGS. 4A to 5B, the sun spot phenomenon may be attenuated by using the reset adjustment circuit 130. However, in the case of increasing the voltage of the clamp control signal CCLP to further attenuate the sun spot phenomenon, the column fixed pattern noise issue may occur due to the threshold voltage distribution of each of the reset transistor RST and the clamp transistor CLPR. Accordingly, the voltage of the clamp control signal CCLP should be set to be sufficiently lower than the voltage level of the reference voltage established through the reset transistor RST. In this case, because the voltage of the clamp signal CLP is not set to be sufficiently high, the reset adjustment circuit 130 may fail to sufficiently remove the sun spot phenomenon.

The image sensor device 100 according to some implementations of the present disclosure may include the reset adjustment circuit 130. The clamp transistor CLPR included in the reset adjustment circuit 130 may operate in a linear region in the turn-on state. As such, the influence of the threshold voltage distribution of the clamp transistor CLPR on the voltage of the clamp signal CLP may decrease. Accordingly, without the column fixed pattern noise issue, the reset adjustment circuit 130 may output the clamp signal CLP whose voltage level is higher than that of the clamp signal CLP described with reference to FIGS. 4A to 5B. This means that an image sensor device with improved performance and an operation method thereof are provided.

Figure 6:
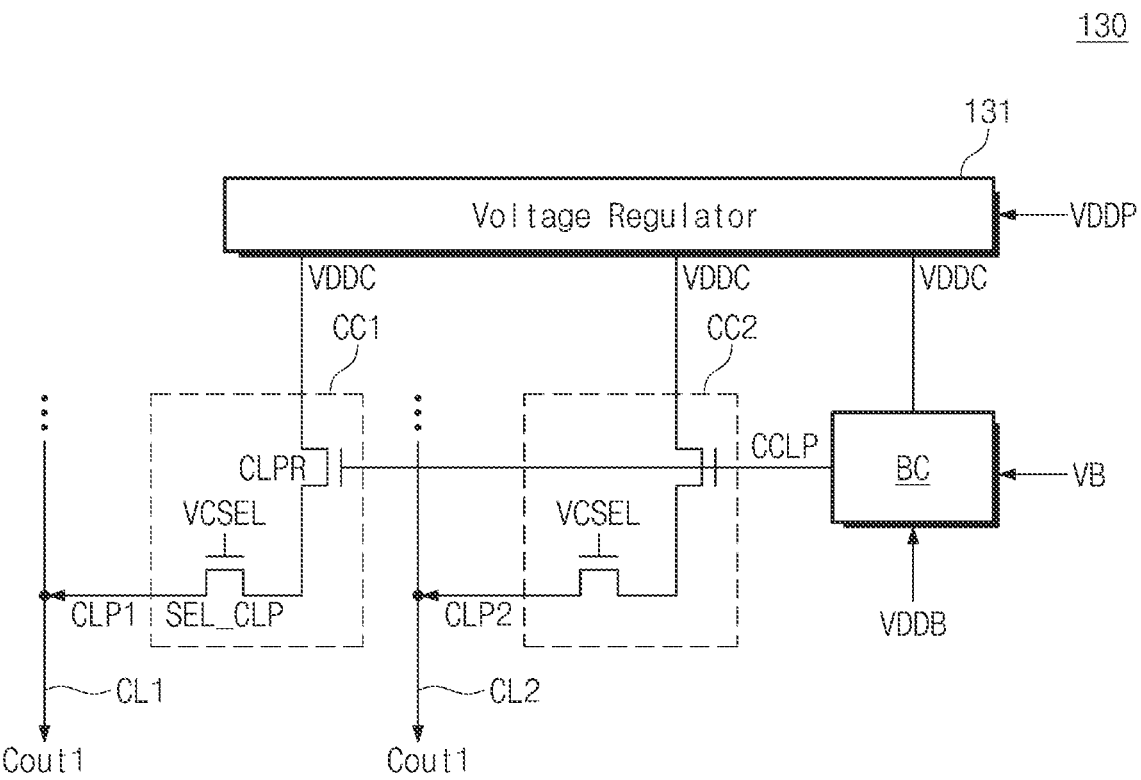
FIG. 6 is a diagram for describing an operation of a reset adjustment circuit according to some implementations of the present disclosure.

FIG. 6 is a diagram for describing an operation of a reset adjustment circuit according to some implementations of the present disclosure. FIG. 6 will be described with reference to FIGS. 1 to 3. Referring to FIG. 6, the reset adjustment circuit 130 may include the plurality of clamp circuits CC1 and CC2, a voltage regulator 131, and the bias circuit BC. An example in which the reset adjustment circuit 130 includes two clamp circuits CC1 and CC2 is illustrated in FIG. 6, but the present disclosure is not limited thereto.

The plurality of clamp circuits CC1 and CC2 may be connected to the column lines CL1 and CL2. The first column output signal Cout1 may be output through the first column line CL1, and the second column output signal Cout2 may be output through the second column line CL2. For example, the first clamp circuit CC1 may be connected to the first column line CL1, and the second clamp circuit CC2 may be connected to the second column line CL2. For example, the first clamp circuit CC1 may output the first clamp signal CLP1 to the first column line CL1, and the second clamp circuit CC2 may output the second clamp signal CLP2 to the second column line CL2.

Each of the plurality of the clamp circuits CC1 and CC2 may include the clamp transistor CLPR and the clamp select transistor SEL_CLP. The clamp transistor CLPR may include a first node to which the clamp power supply voltage VDDC is applied, a gate connected to the bias circuit BC to receive the clamp control signal CCLP, and a second node connected to a first node of the clamp select transistor SEL_CLP.

The clamp select transistor SEL_CLP may include the first node connected to the second node of the clamp transistor CLPR, a gate receiving the clamp selection signal VCSEL, and a second node connected to the column line CL1/CL2.

The bias circuit BC may receive the bias signal VB from the control circuit 170 (refer to FIG. 1). The bias circuit BC may output the clamp control signal CCLP based on the bias signal VB, the clamp power supply voltage VDDC applied from the voltage regulator 131, and a bias power supply voltage VDDB applied from the outside (e.g., a power management integrated circuit (PMIC)).

The voltage regulator 131 may generate the clamp power supply voltage VDDC based on the pixel power supply voltage VDDP applied from the outside (e.g., PMIC). The voltage regulator 131 may apply the clamp power supply voltage VDDC to the clamp transistors CLPR.

In some implementations, the clamp power supply voltage VDDC may be lower in level than the pixel power supply voltage VDDP (refer to FIG. 2). Also, the pixel power supply voltage VDDP may be used as the bias power supply voltage VDDB. In this case, the voltage level of the clamp control signal CCLP of the logic high level may be equal to the voltage level of the pixel power supply voltage VDDP.

Accordingly, when the clamp select transistor SEL_CLP is turned on in response to the clamp selection signal VCSEL of the logic high level and the clamp transistor CLPR is turned on in response to the clamp control signal CCLP of the logic high level, the clamp transistor CLPR may operate in the linear region.

In some implementations, the voltage level of the pixel power supply voltage VDDP may be 2.2 V, the voltage level of the clamp power supply voltage VDDC may be 1.8 V, and the voltage level of the clamp control signal CCLP of the logic high level may be 2.2 V. According to the above bias condition, the clamp transistor CLPR may operate in the linear region in the turn-on state.

In some implementations, a voltage level difference of the pixel power supply voltage VDDP and the clamp power supply voltage VDDC may be 200 mV or more.

For example, when a transistor operates in a saturation region, an output current of the transistor may be calculated by Equation 1 below.

$$I_D = \frac{K}{2}\left(\frac{W}{L}\right)(V_{GS} - V_T)^2 \qquad \text{[Equation 1]}$$

Herein, K means a transconductance parameter, W means a channel width of a transistor, L means a channel length of a transistor, $V_{GS}$ means a gate-source voltage of a transistor, and $V_\tau$ means a threshold voltage of a transistor.

Referring to Equation 1 above, a relationship between a threshold voltage and a source voltage of a transistor operating in the saturation region may be expressed by Equation 2 below.

$$\left|\frac{\partial V_S}{\partial V_T}\right| = 1 \qquad \text{[Equation 2]}$$

Referring to Equation 2 above, when the transistor operates in the saturation region, a change in the threshold voltage may be directly applied to the source voltage.

For example, when the transistor operates in the linear region, an output current of the transistor may be calculated by Equation 3 below.

$$I_D = \frac{K}{2}\left(\frac{W}{L}\right)(2(V_{GS} - V_T)V_{DS} - V_{DS}^2) \qquad \text{[Equation 3]}$$

Herein, K means a transconductance parameter, W means a channel width of a transistor, L means a channel length of a transistor, $V_{GS}$ means a gate-source voltage of a transistor, $V_\tau$ means a threshold voltage of a transistor, and $V_{DS}$ means a drain-source voltage of a transistor.

Referring to Equation 3 above, a relationship between a threshold voltage and a source voltage of a transistor operating in the linear region may be expressed by Equation 4 below.

$$\frac{\partial V_S}{\partial V_T} = -\frac{\partial V_S}{\partial V_G} = -\text{gain} \qquad \text{[Equation 4]}$$

Referring to Equation 4 above, when the transistor operates in the linear region, the magnitude of the influence of the change in the threshold voltage on the source voltage may be equal to the magnitude of the change in the gate voltage on the source voltage. For example, the gate of the transistor may be an input terminal receiving an input signal, and the source of the transistor may be an output terminal. In this case, the magnitude of the influence of the change in the threshold voltage on the source voltage may be equal to the magnitude of the gain of the transistor.

For example, as described above in relation to Equation 2, when the clamp transistors CLPR operate in the saturation region, a change in the threshold voltages of the clamp transistors CLPR may be directly applied to the source voltages of the clamp transistors CLPR. This means that the threshold voltage change of the clamp transistors CLPR is directly applied to the voltages of the clamp signals CLP1 and CLP2.

However, as described above, the clamp transistors CLPR may operate in the linear region. In this case, a result of the product of the threshold voltage change of the clamp transistors CLPR and the gain may affect the source voltages of the clamp transistors CLPR.

The gain of the clamp circuits CC1 and CC2 may be smaller in value than "1" due to a source follower characteristic. Accordingly, the influence of the threshold voltage change of the clamp transistors CLPR on the source voltages may decrease compared to the case where the clamp transistors CLPR operate in the saturation region. The voltages of the clamp signals CLP1 and CLP2 may be determined based on the source voltages of the clamp transistors CLPR. Accordingly, when the clamp transistors CLPR operates in the linear region, the influence of the threshold voltage change of the clamp transistors CLPR on the voltages of the clamp signals CLP1 and CLP2 may decrease compared to the case where the clamp transistors CLPR operate in the saturation region.

Figure 7:
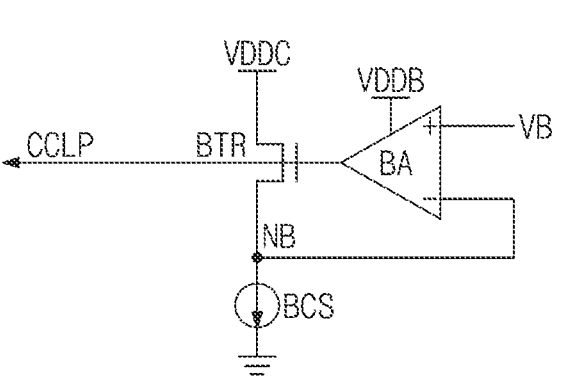
FIG. 7 is a circuit diagram for describing a bias circuit according to some implementations of the present disclosure.

FIG. 7 is a circuit diagram for describing a bias circuit according to an implementation of the present disclosure. FIG. 7 will be described with reference to FIGS. 1 to 3 and 6. Referring to FIG. 7, the bias circuit BC may output the clamp control signal CCLP based on the bias signal VB, the clamp power supply voltage VDDC, and the bias power supply voltage VDDB. The bias circuit BC may include a bias amplifier BA, a bias transistor BTR, and a bias current source BCS.

The bias amplifier BA may include a first input terminal receiving the bias signal VB from the control circuit 170, a second input terminal connected to a bias node NB, and an output terminal connected to the gate of the bias transistor BTR and the gate of the clamp transistor CLPR.

Referring to FIGS. 6 and 7, the output terminal of the bias amplifier BA may be connected to the gate of the bias transistor BTR and the gates of the clamp transistors CLPR respectively included in the plurality of clamp circuits CC.

The bias amplifier BA may output the clamp control signal CCLP based on the bias power supply voltage VDDB applied from the outside (e.g., PMIC), the bias signal VB, and the voltage of the bias node NB.

The bias transistor BTR may be connected between the clamp power supply voltage VDDC and the bias node NB. The bias transistor BTR may operate based on the clamp control signal CCLP. For example, the bias transistor BTR may be turned on in response to the clamp control signal CCLP of the logic high level.

For example, the clamp power supply voltage VDDC may be generated by the voltage regulator 131 (refer to FIG. 6). For example, the voltage level of the clamp power supply voltage VDDC may be lower than the voltage level of the pixel power supply voltage VDDP.

The bias current source BCS may be connected between the bias node NB and a ground node.

Meanwhile, referring to FIGS. 6 and 7, when the pixel power supply voltage VDDP is used as the bias power supply voltage VDDB, the voltage of the clamp control signal CCLP may be higher in level than the clamp power supply voltage VDDC. As such, when the clamp transistor CLPR is turned on, the clamp transistor CLPR may operate in the linear region.

As described with reference to Equation 3 above, the current generated by the clamp transistor CLPR in the turn-on state may be affected by the drain voltage VDDC of the clamp transistor CLPR. The voltage of the clamp signal CLP may be determined based on the current generated by the clamp transistor CLPR. For example, assuming that the voltage of the clamp control signal CCLP is irrelevant to the clamp power supply voltage VDDC, when the clamp power supply voltage VDDC fluctuates due to an external factor (e.g., a noise input to the clamp power supply voltage VDDC), the voltage of the clamp signal CLP may fluctuate. In this case, the reset adjustment circuit 130 may fail to correctly perform the function of adjusting the voltage of the column line CL.

The bias circuit BC according to some implementations of the present disclosure may generate the clamp control signal CCLP based on the clamp power supply voltage VDDC. This means that the voltage of the clamp signal CLP does not fluctuate even though the clamp power supply voltage VDDC fluctuates.

In detail, when the clamp power supply voltage VDDC fluctuates due to a factor such as a noise, the voltage of the bias node NB may fluctuate. The bias amplifier BA may generate the clamp control signal CCLP based on the voltage of the bias node NB and the bias signal VB. In other words, the clamp control signal CCLP may be a signal to which the fluctuations of the clamp power supply voltage VDDC is applied (or a signal that is generated in synchronization with the fluctuations of the clamp power supply voltage VDDC).

In this case, the clamp control signal CCLP may attenuate the influence of the fluctuations of the clamp power supply voltage VDDC connected to the clamp transistor CLPR on the current generated by the clamp transistor CLPR. That is, the influence of the fluctuations of the clamp power supply voltage VDDC on the current generated by the clamp transistor CLPR may decrease. This means that the voltage of the clamp signal CLP does not fluctuate even though the clamp power supply voltage VDDC fluctuates.

In other words, the bias circuit BC according to some implementations of the present disclosure may output the clamp control signal CCLP to which the fluctuations of the clamp power supply voltage VDDC is applied. This means that the voltage of the clamp signal CLP does not fluctuate even though the clamp power supply voltage VDDC fluctuates due to a factor such as a noise. That is, the reset adjustment circuit 130 may output the clamp signal CLP having no influence of the fluctuations of the clamp power supply voltage VDDC.

Figure 8:
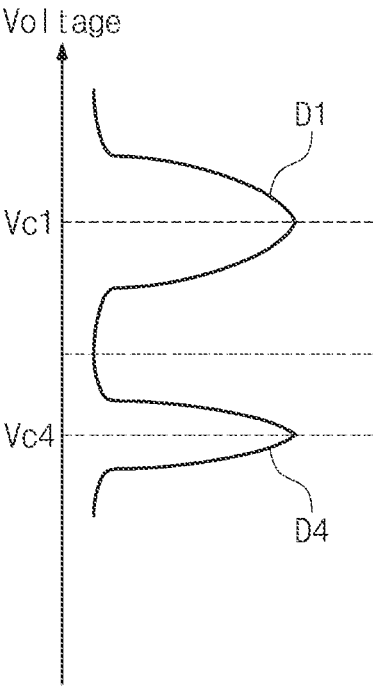
FIG. 8 is a graph for describing an effect of a reset adjustment circuit according to some implementations of the present disclosure.

FIG. 8 is a graph for describing an effect of a reset adjustment circuit according to some implementations of the present disclosure. In the graph of FIG. 8, a vertical axis of a graph represents a voltage. FIG. 8 will be described with reference to FIGS. 1 to 3, 6, and 7. In FIG. 8, it is assumed that the intensity of light incident onto the pixel PX is not excessively high. Also, as described with reference to FIGS. 6 and 7, in FIG. 8, it is assumed that the clamp transistor CLPR operates in the linear region when outputting the clamp signal CLP.

The description will be described with reference to FIGS. 3 and 8 under the condition that the reset transistor RST and the transfer transistor TX are turned off, the select transistor SEL is turned on, and the floating diffusion node FD is reset based on the pixel power supply voltage VDDP. A voltage distribution of the floating diffusion node FD may be determined based on the pixel power supply voltage VDDP and a threshold voltage distribution of the reset transistor RST. The voltage of the pixel signal PIX may be determined based on the voltage of the floating diffusion node FD. In this case, the pixel signal PIX may have the first voltage distribution D1 based on the voltage of the floating diffusion node FD. For example, the first voltage distribution D1 may have the Gaussian distribution shape formed with respect to the first center voltage Vc1.

As described above, the voltage of the column output signal Cout, which is established immediately after the select transistor SEL is turned on to perform the reset sampling operation, may be referred to as a "reference voltage." Immediately after the select transistor SEL is turned on to perform the reset sampling operation, a voltage distribution of the column output signal Cout may be equal to the first voltage distribution D1. Accordingly, the first voltage distribution D1 may mean the voltage distribution of the reference voltage.

Also, when the clamp transistor CLPR and the clamp select transistor SEL_CLP are turned on and the clamp transistor CLPR operates in the linear region, the clamp signal CLP may have a fourth voltage distribution D4. For example, the fourth voltage distribution D4 may have the Gaussian distribution shape formed with respect to a fourth center voltage Vc4.

As described with reference to FIG. 6, as the clamp transistor CLPR operates in the linear region, the influence of the threshold voltage distribution of the clamp transistor CLPR on the voltage distribution of the clamp signal CLP may decrease. Accordingly, the standard deviation of the fourth voltage distribution D4 may be smaller than the standard deviation of the second and third voltage distributions D2 and D3 of FIG. 5A.

This means that it is possible to implement the bias circuit BC of the reset adjustment circuit 130 such that there is the clamp control signal CCLP whose high-level voltage is greater than that described with reference to FIG. 5A. Even though the reset adjustment circuit 130 generates the clamp control signal CCLP whose high-level voltage is greater than that described with reference to FIG. 5A, the first voltage distribution D1 and the fourth voltage distribution D4 may not overlap each other.

Accordingly, the reset adjustment circuit 130 according to some implementations of the present disclosure may allow the clamp transistor CLPR to operate in the linear region, and thus, the high-level voltage of the clamp control signal CCLP may be increased without the column fixed pattern noise issue. This means that the ability of the reset adjustment circuit 130 to remove the sun spot phenomenon is improved.

Figures 9A, 9B:
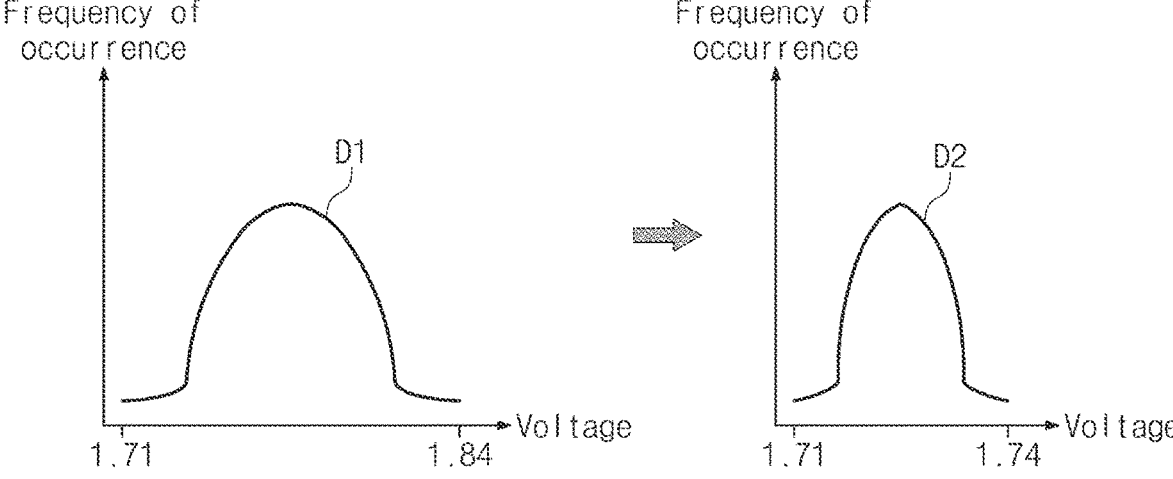
FIGS. 9A and 9B are diagrams for describing simulation results of an image sensor device according to some implementations of the present disclosure.

FIGS. 9A and 9B are diagrams for describing simulation results of an image sensor device according to some implementations of the present disclosure. FIGS. 9A and 9B will be described with reference to FIGS. 1 to 3, 6, and 7. In the graphs of FIG. 9B, a horizontal axis represents a voltage, and a vertical axis represents the frequency of occurrence.

FIGS. 9A and 9B show a result of the first simulation and a result of the second simulation. For example, referring to FIG. 3, the first simulation may be performed under the condition that the reset transistor RST, the select transistor SEL, the clamp transistor CLPR, and the clamp select transistor SEL_CLP are turned on and the transfer transistor TX is turned off. Also, when the first simulation is performed, the voltage level of the pixel power supply voltage VDDP and the clamp power supply voltage VDDC may be 2.2 V, and the clamp transistor CLPR may operate in the saturation region in the turn-on state.

For example, the second simulation may be performed under the condition that the reset transistor RST, the select transistor SEL, the clamp transistor CLPR, and the clamp select transistor SEL_CLP are turned on and the transfer transistor TX is turned off. Also, when the second simulation is performed, the voltage level of the pixel power supply voltage VDDP may be 2.2 V, the voltage level of the clamp power supply voltage VDDC may be 1.8 V, and the clamp transistor CLPR may operate in the linear region in the turn-on state.

Meanwhile, in the first and second simulations, the clamp control signal CCLP of the logic high level may have the same voltage level.

Referring to FIGS. 9A and 9B, in the first simulation, the voltage distribution of the column output signal Cout may be formed like the first voltage distribution D1. In the second simulation, the voltage distribution of the column output signal Cout may be formed like the second voltage distribution D2. The standard deviation Std of the second voltage distribution D2 may be smaller than the standard deviation Std of the first voltage distribution D1. That is, compared to the first voltage distribution D1, the second voltage distribution D2 may have a small influence of the threshold voltage change of the reset transistor RST and the clamp transistor CLPR.

Meanwhile, an average Avg of the column output signal Cout in the first simulation may be greater than an average Avg of the column output signal Cout in the second simulation. The reason is that the clamp control signal CCLP of the logic high level has the same voltage level in the first and second simulations. It may be confirmed from the second simulation that the influence of the threshold voltage distribution of the clamp transistor CLPR on the voltage of the clamp signal CLP decreases. Accordingly, in the case where the clamp transistor CLPR operates in the linear region, it may be possible to make the voltage of the clamp control signal CCLP relatively high compared to the first simulation without the column fixed pattern noise issue. In this case, the voltage distribution of the column output signal Cout may be formed such that the average Avg is greater in value than that of the first voltage distribution D1 and the standard deviation Std is smaller than that of the first voltage distribution D1.

Figure 10A:
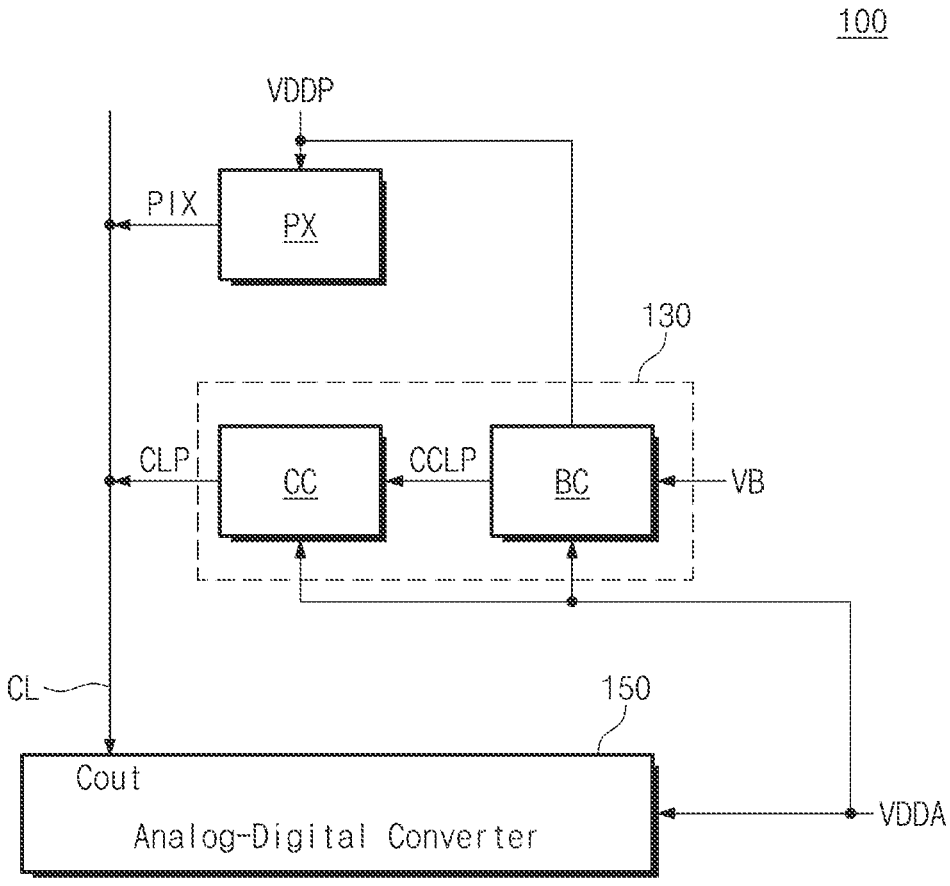
FIGS. 10A to 10C are diagrams for describing examples of an image sensor device according to some implementations of the present disclosure.
Figure 10B:
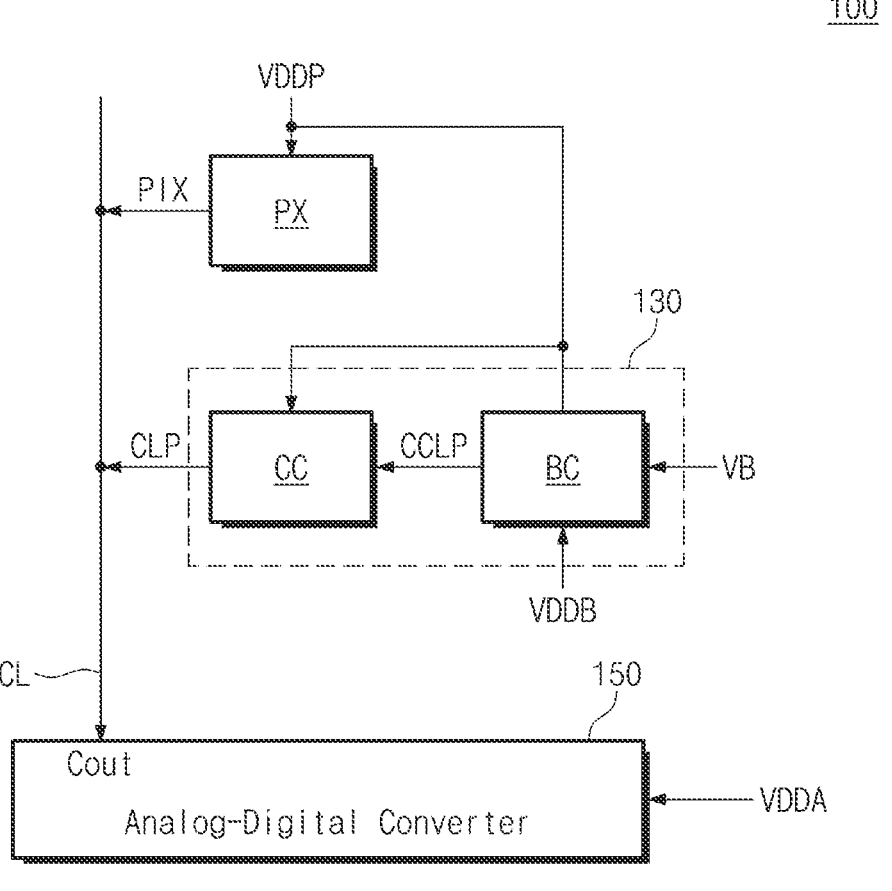
Figure 10C:
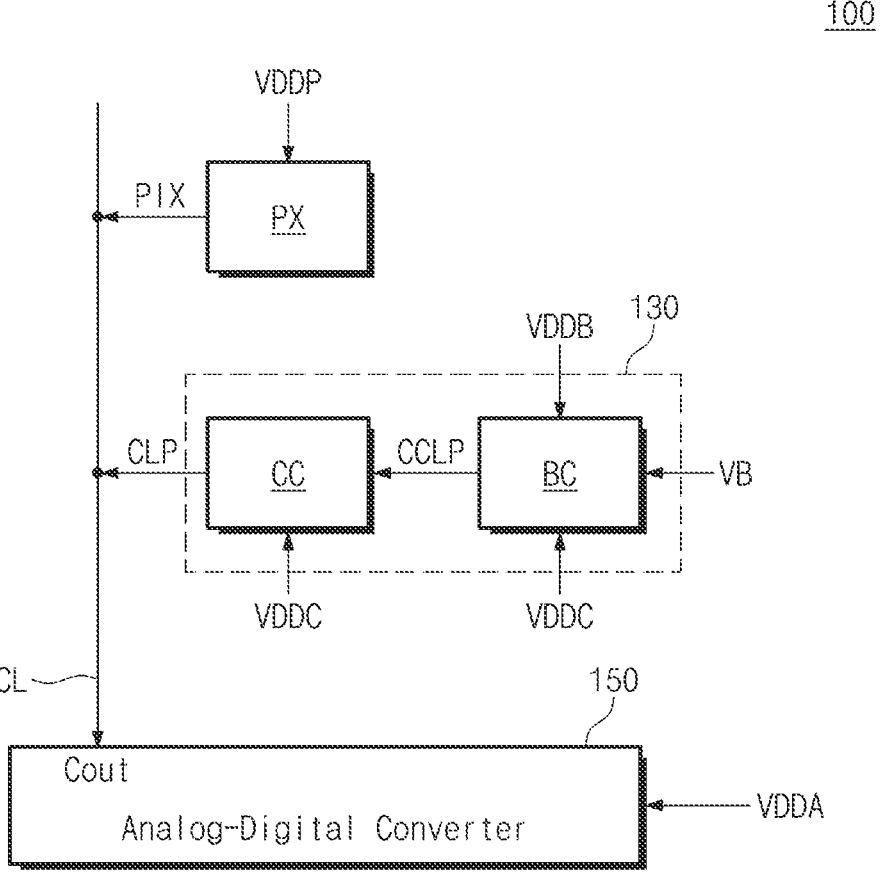

FIGS. 10A to 10C are diagrams for describing examples of an image sensor device according to some implementations of the present disclosure. FIGS. 10A to 10C will be described with reference to FIGS. 1 to 3, 6, and 7.

Referring to FIGS. 10A to 10C, the image sensor device 100 may include the pixel PX, the reset adjustment circuit 130, and the analog-to-digital converter 150.

The pixel PX may be connected to the column line CL and may output the pixel signal PIX to the column line CL. The pixel PX may operate based on the pixel power supply voltage VDDP from the outside (e.g., PMIC).

The reset adjustment circuit 130 may include the clamp circuit CC and the bias circuit BC. The reset adjustment circuit 130 may output the clamp signal CLP to the column line CL based on the bias signal VB.

Configurations and operations of the clamp circuit CC and the bias circuit BC may be the same or similar to those described with reference to FIGS. 6 and 7. In detail, the clamp circuit CC may include the clamp transistor CLPR and the clamp select transistor SEL_CLP. The clamp transistor CLPR may output the clamp signal CLP based on the clamp control signal CCLP of the logic high level. The bias circuit BC may include the bias amplifier BA, the bias transistor BTR, and the bias current source BCS and may output the clamp control signal CCLP based on the bias signal VB.

The analog-to-digital converter 150 may include a plurality of comparators and a plurality of counters. Each of the plurality of comparators may be implemented with one or more amplifiers, for example, operational transconductance amplifiers (OTAs). Each of the plurality of comparators may operate based on an ADC power supply voltage VDDA from the outside (e.g., PMIC).

Referring to FIGS. 6, 7, and 10A, in some implementations, the reset adjustment circuit 130 may not include the voltage regulator 131 (refer to FIG. 6) unlike the reset adjustment circuit 130 illustrated in FIG. 6. In this case, the clamp circuit CC may operate based on the ADC power supply voltage VDDA. That is, the clamp transistor CLPR may be connected to the ADC power supply voltage VDDA. In other words, the, the ADC power supply voltage VDDA may be used as the clamp power supply voltage VDDC.

Also, the bias circuit BC may operate based on the pixel power supply voltage VDDP and the ADC power supply voltage VDDA. In this case, the bias amplifier BA may operate based on the pixel power supply voltage VDDP. That is, the pixel power supply voltage VDDP may be used as the bias power supply voltage VDDB. The bias transistor BTR may be connected to the ADC power supply voltage VDDA.

For example, the voltage level of the ADC power supply voltage VDDA may be lower than the voltage level of the pixel power supply voltage VDDP. Also, the voltage level of the clamp control signal CCLP of the logic high level may be higher than the voltage level of the ADC power supply voltage VDDA. According to the above bias condition, the clamp transistor CLPR may operate in the linear region in the turn-on state.

In some implementations, the voltage level of the pixel power supply voltage VDDP may be 2.2 V, the voltage level of the ADC power supply voltage VDDA may be 1.8 V, and the voltage level of the clamp control signal CCLP of the logic high level of the logic high level may be 2.2 V. According to the above bias condition, the clamp transistor CLPR may operate in the linear region in the turn-on state.

In some implementations, a voltage level difference of the pixel power supply voltage VDDP and the ADC power supply voltage VDDA may be 200 mV or more.

Referring to FIG. 10B, in another implementation, the reset adjustment circuit 130 may not include the voltage regulator 131 (refer to FIG. 6) unlike the reset adjustment circuit 130 illustrated in FIG. 6. In this case, the clamp circuit CC may operate based on the pixel power supply voltage VDDP. That is, the clamp transistor CLPR may be connected to the pixel power supply voltage VDDP. In other words, the pixel power supply voltage VDDP may be used as the clamp power supply voltage VDDC.

Meanwhile, the bias circuit BC may operate based on the pixel power supply voltage VDDP and the bias power supply voltage VDDB. The bias transistor BTR may be connected to the pixel power supply voltage VDDP, and the bias amplifier BA may be connected to the bias power supply voltage VDDB. The bias power supply voltage VDDB may be a voltage that is generated on the outside.

In this case, the voltage level of the bias power supply voltage VDDB may be higher than the voltage level of the pixel power supply voltage VDDP. This means that the voltage level of the clamp control signal CCLP of the logic high level is higher than the voltage level of the pixel power supply voltage VDDP. According to the above bias condition, the clamp transistor CLPR may operate in the linear region in the turn-on state.

In some implementations, the voltage level of the pixel power supply voltage VDDP may be 2.2 V, and the voltage level of the bias power supply voltage VDDB and the voltage level of the clamp control signal CCLP of the logic high level may be 2.2 V or higher. According to the above bias condition, the clamp transistor CLPR may operate in the linear region in the turn-on state.

Referring to FIG. 10C, in another implementation, the clamp circuit CC may operate based on the clamp power supply voltage VDDC. In this case, the clamp transistor CLPR may be connected to the clamp power supply voltage VDDC.

Meanwhile, the bias circuit BC may operate based on the clamp power supply voltage VDDC and the bias power supply voltage VDDB. The bias transistor BTR may be connected to the clamp power supply voltage VDDC, and the bias amplifier BA may be connected to the bias power supply voltage VDDB.

In this case, the voltage level of the bias power supply voltage VDDB may be higher than the voltage level of the pixel power supply voltage VDDP. Also, the voltage level of the clamp power supply voltage VDDC may be lower than the voltage level of the pixel power supply voltage VDDP. According to the above bias condition, the clamp transistor CLPR may operate in the linear region in the turn-on state.

For example, the clamp power supply voltage VDDC may be a voltage generated by the voltage regulator 131 (refer to FIG. 7) or may be the ADC power supply voltage VDDA. For example, the bias power supply voltage VDDB may be a voltage that is generated on the outside.

As described above, the image sensor device 100 according to some implementations of the present disclosure may adjust the clamp power supply voltage VDDC and the bias power supply voltage VDDB. Accordingly, the clamp transistor CLPR may operate in the linear region in the turn-on state. This means that the image sensor device 100 with improved performance is provided.

Figure 11:
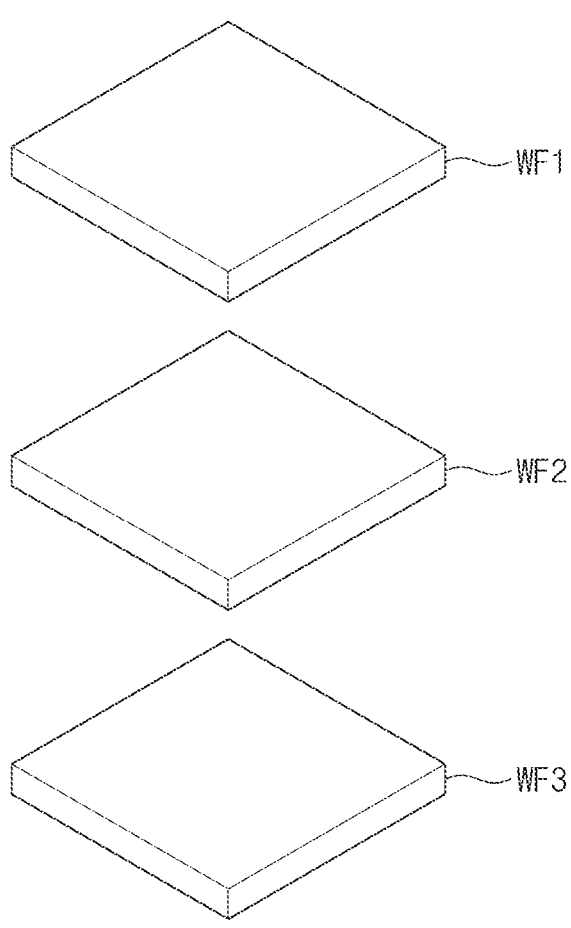
FIG. 11 is a diagram for describing a stacked structure of an image sensor device according to some implementations of the present disclosure.

FIG. 11 is a diagram for describing a stacked structure of an image sensor device according to some implementations of the present disclosure. Referring to FIG. 11, the image sensor device 100 may include first to third chips WF1 to WF3. Each of the first to third chips WF1 to WF3 may be formed in an independent semiconductor wafer. The first chip WF1 may be stacked on the second chip WF2, and the second chip WF2 may be stacked on the third chip WF3. The first to third chips WF1 to WF3 may be electrically connected to each other by using various coupling methods such as a bonding method and a through silicon via (TSV) method.

The first to third chips WF1 to WF3 may include various components of the image sensor device 100, for example, a pixel array, a row decoder, an analog-to-digital converter, a reset adjustment circuit, a ramp generator, an I/O circuit, a control logic circuit, etc.

For example, the first chip WF1 may include the pixel array and the row decoder, the second chip WF2 may include the analog-to-digital converter, the reset adjustment circuit, the ramp generator, and the control logic circuit, and the third chip WF3 may include the I/O circuit. However, the present disclosure is not limited thereto. For example, the components of the image sensor device 100 may be distributed and disposed in the first to third chips WF1 to WF3 in various shapes depending on the way to implement.

Figure 12:
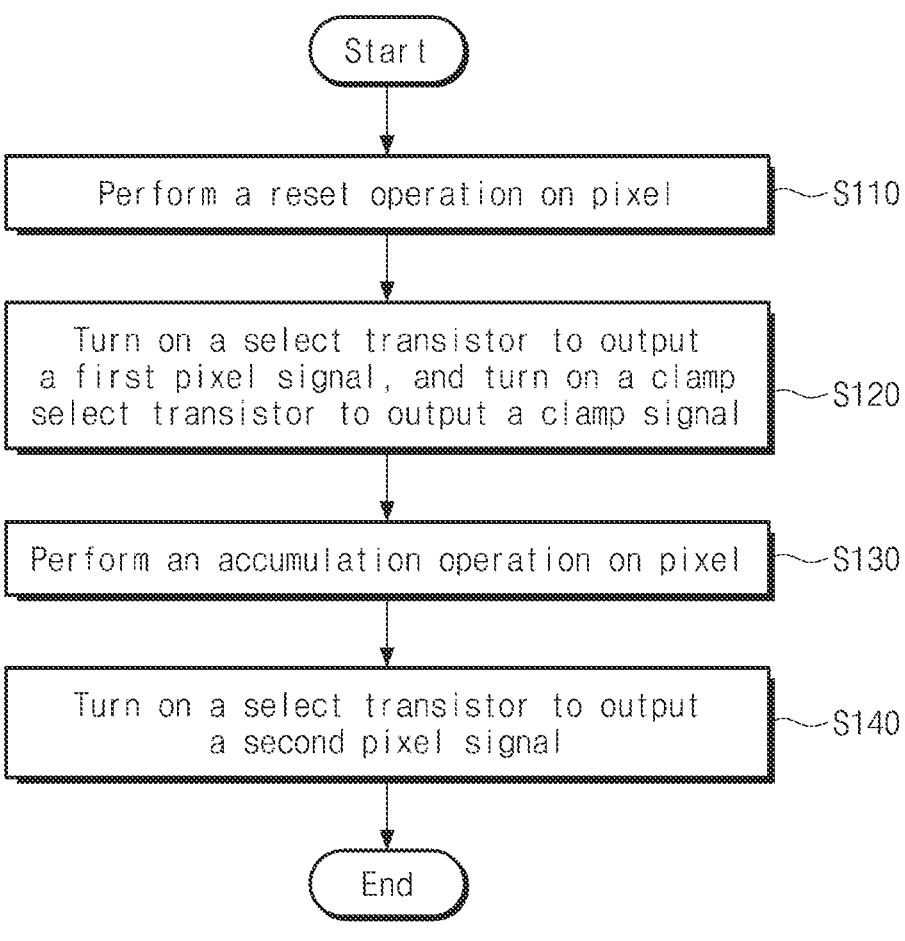
FIG. 12 is a flowchart illustrating an example of an operation method of an image sensor device according to some implementations of the present disclosure.

FIG. 12 is a flowchart illustrating an example of an operation method of an image sensor device according to some implementations of the present disclosure. FIG. 12 will be described with reference to FIGS. 1 to 11.

In operation S110, the reset operation of the pixel PX may be performed by turning on the reset transistor RST. In this case, the floating diffusion node FD may be reset based on the pixel power supply voltage VDDP.

In operation S120, the reset transistor RST may be turned off, and the select transistor SEL may be turned on. In this case, the pixel PX may output the first pixel signal PIX to the column line CL. The voltage level of the first pixel signal PIX may be determined based on the voltage level of the floating diffusion node FD thus reset. Also, the clamp select transistor SEL_CLP may be turned on. In this case, the reset adjustment circuit 130 may output the clamp signal CLP to the column line CL.

The voltage level of the column line CL may be the voltage level of the first pixel signal PIX or the clamp signal CLP. For example, when the voltage of the first pixel signal PIX is higher in level than the voltage of the clamp signal CLP, the voltage of the column line CL may be the voltage of the first pixel signal PIX. For example, when the voltage of the first pixel signal PIX is lower in level than the voltage of the clamp signal CLP, the voltage of the column line CL may be the voltage of the clamp signal CLP. For example, the voltage of the first pixel signal PIX may be a reference voltage. The reference voltage may have the voltage level of the column line CL, which is established immediately after the reset operation is performed. For example, the voltage of the first pixel signal PIX is lower in level than the reference voltage.

While the clamp select transistor SEL_CLP is in the turn-on state, the clamp transistor CLPR may be turned on. The clamp transistor CLPR may operate in the linear region in the turn-on state.

In operation S130, the select transistor SEL and the clamp select transistor SEL_CLP may be turned off, and the transfer transistor TX may be turned on. In this case, the pixel PX may perform the integration operation.

In operation S140, the select transistor SEL may be again turned on. In this case, the pixel PX may output the second pixel signal PIX to the column line CL. The voltage of the column line CL may be determined based on the voltage of the second pixel signal PIX.

Figure 13:
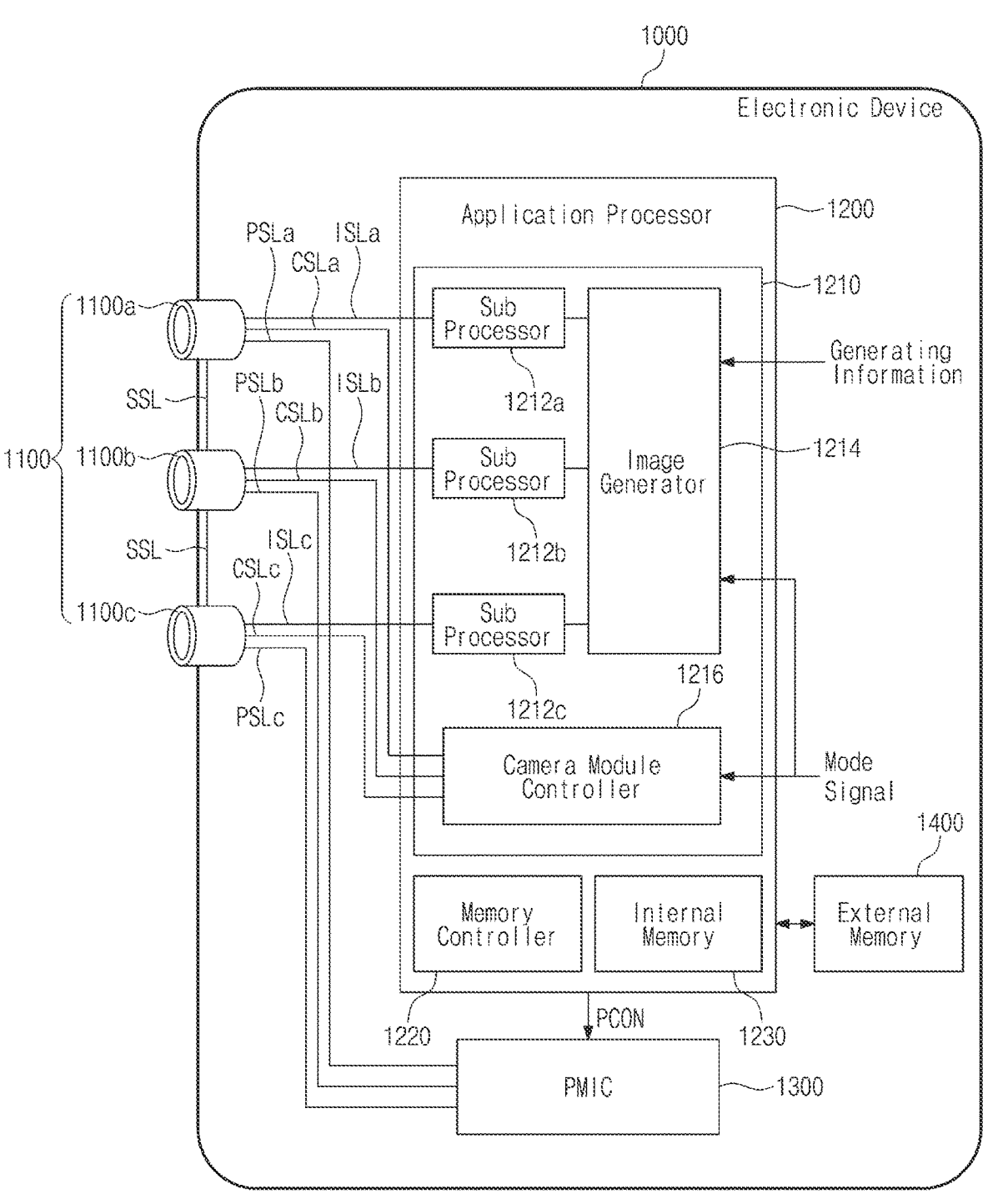
FIG. 13 is a block diagram of an electronic device including a multi-camera module according to some implementations of the present disclosure.
Figure 14:
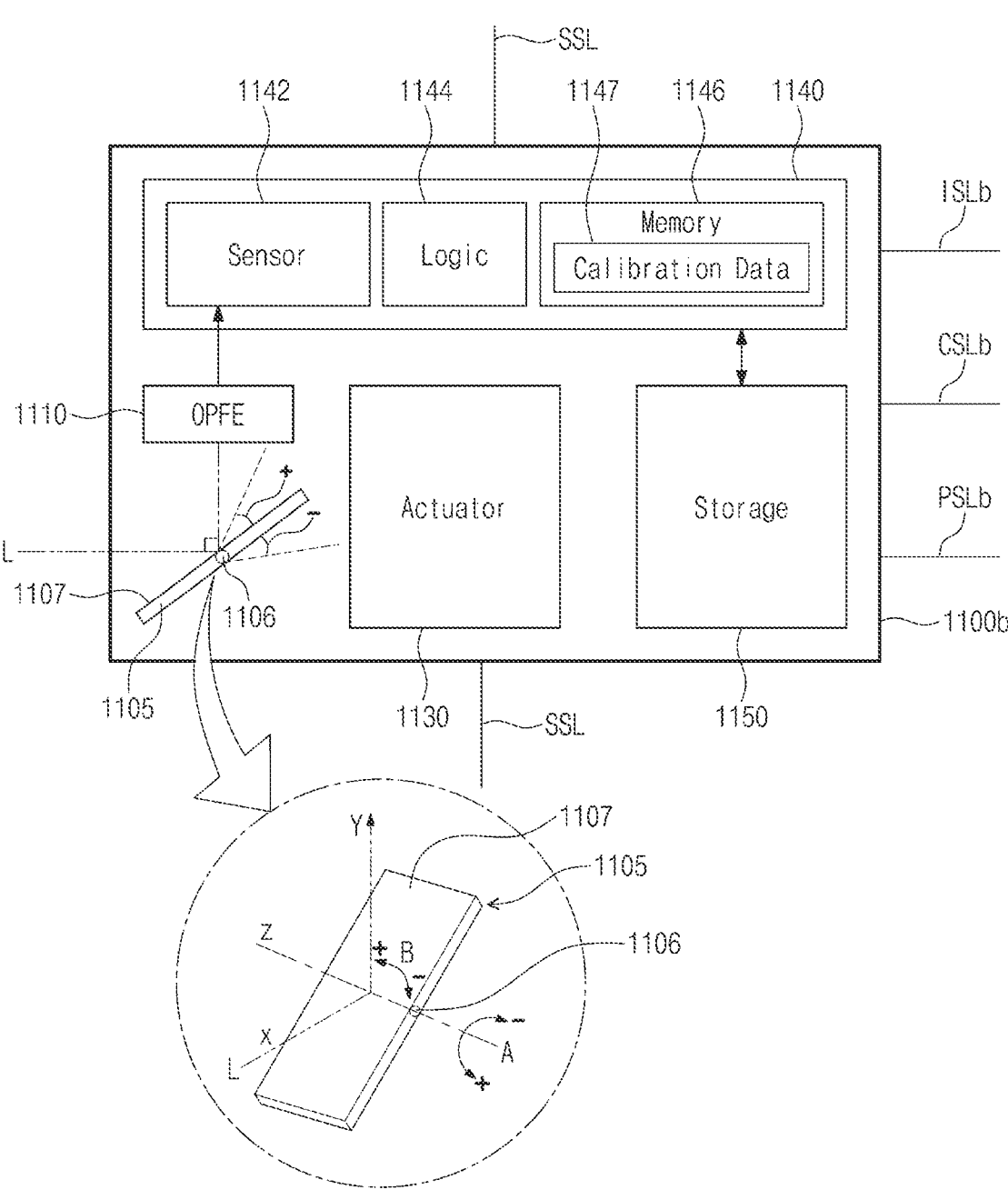
FIG. 14 is a block diagram illustrating a camera module of FIG. 13 in detail.

FIG. 13 is a block diagram of an electronic device including a multi-camera module according to some implementations of the present disclosure. FIG. 14 is a block diagram illustrating a camera module of FIG. 13 in detail.

Referring to FIG. 13, an electronic device 1000 may include a camera module group 1100, an application processor 1200, a PMIC 1300, and an external memory 1400.

The camera module group 1100 may include a plurality of camera modules 1100a, 1100b, and 1100c. An electronic device including three camera modules 1100a, 1100b, and 1100c is illustrated in FIG. 13, but the present disclosure is not limited thereto. In some implementations, the camera module group 1100 may be modified to include only two camera modules. Also, in some implementations, the camera module group 1100 may be modified to include n camera modules (n being a natural number of 4 or more).

Below, a detailed configuration of the camera module 1100b will be more fully described with reference to FIG. 14, but the following description may be similarly applied to the remaining camera modules 1100a and 1100c.

Referring to FIG. 14, the camera module 1100*b* may include a prism 1105, an optical path folding element (OPFE) 1110, an actuator 1130, an image sensing device 1140, and storage 1150.

The prism 1105 may include a reflecting plane 1107 of a light reflecting material and may change a path of a light "L" incident from the outside.

In some implementations, the prism 1105 may change a path of the light "L" incident in a first direction (X) to a second direction (Y) perpendicular to the first direction (X), Also, the prism 1105 may change the path of the light "L" incident in the first direction (X) to the second direction (Y) perpendicular to the first (X-axis) direction by rotating the reflecting plane 1107 of the light reflecting material in direction A about a central axis 1106 or rotating the central axis 1106 in direction B. In this case, the OPFE 1110 may move in a third direction (Z) perpendicular to the first direction (X) and the second direction (Y).

In some implementations, as illustrated in FIG. 14, a maximum rotation angle of the prism 1105 in direction A may be equal to or smaller than 15 degrees in a positive A direction and may be greater than 15 degrees in a negative A direction, but the present disclosure is not limited thereto.

In some implementations, the prism 1105 may move within approximately 20 degrees in a positive or negative B direction, between 10 degrees and 20 degrees, or between 15 degrees and 20 degrees; here, the prism 1105 may move at the same angle in the positive or negative B direction or may move at a similar angle within approximately 1 degree.

In some implementations, the prism 1105 may move the reflecting plane 1107 of the light reflecting material in the third direction (e.g., Z direction) parallel to a direction in which the central axis 1106 extends.

The OPFE 1110 may include optical lenses composed of m groups (m being a natural number), for example. Here, m lens may move in the second direction (Y) to change an optical zoom ratio of the camera module 1100*b*. For example, when a default optical zoom ratio of the camera module 1100*b* is Z, the optical zoom ratio of the camera module 1100*b* may be changed to an optical zoom ratio of 3Z, 5Z, or 5Z or more by moving m optical lens included in the OPFE 1110. The OPFE 1110 may further include an optical lens composed of n groups (n being a natural number) in front of the m lens described above.

The actuator 1130 may move the OPFE 1110 or an optical lens (hereinafter referred to as an "optical lens") to a specific location. For example, the actuator 1130 may adjust a location of an optical lens such that an image sensor 1142 is placed at a focal length of the optical lens for accurate sensing.

The image sensing device 1140 may include the image sensor 1142, control logic 1144, and a memory 1146. The image sensor 1142 may sense an image of a sensing target by using the light L provided through an optical lens. The control logic 1144 may control overall operations of the camera module 1100*b*. For example, the control logic 1144 may control an operation of the camera module 1100*b* based on a control signal provided through a control signal line CSLb.

The memory 1146 may store information, which is necessary for an operation of the camera module 1100*b*, such as calibration data 1147. The calibration data 1147 may include information necessary for the camera module 1100*b* to generate image data by using the light L provided from the outside. The calibration data 1147 may include, for example, information about the degree of rotation described above, information about a focal length, information about an optical axis, etc. In the case where the camera module 1100*b* is implemented in the form of a multi-state camera in which a focal length varies depending on a location of an optical lens, the calibration data 1147 may include a focal length value for each location (or state) of the optical lens and information about auto focusing.

The storage 1150 may store image data sensed through the image sensor 1142. The storage 1150 may be disposed outside the image sensing device 1140 and may be implemented in a shape where the storage 1150 and a sensor chip constituting the image sensing device 1140 are stacked. In some implementations, the storage 1150 may be implemented with an electrically erasable programmable read only memory (EEPROM), but the present disclosure is not limited thereto.

Referring together to FIGS. 13 and 14, in some implementations, each of the plurality of camera modules 1100*a*, 1100*b*, and 1100*c* may include the actuator 1130. As such, the same calibration data 1147 or different calibration data 1147 may be included in the plurality of camera modules 1100*a*, 1100*b*, and 1100*c* depending on operations of the actuators 1130 therein.

In some implementations, one camera module (e.g., 1100*b*) among the plurality of camera modules 1100*a*, 1100*b*, and 1100*c* may be a folded lens shape of camera module in which the prism 1105 and the OPFE 1110 described above are included, and the remaining camera modules (e.g., 1100*a* and 1100*c*) may be a vertical shape of camera module in which the prism 1105 and the OPFE 1110 described above are not included; however, the present disclosure is not limited thereto.

In some implementations, one camera module (e.g., 1100*c*) among the plurality of camera modules 1100*a*, 1100*b*, and 1100*c* may be, for example, a vertical shape of depth camera extracting depth information by using an infrared ray (IR). In this case, the application processor 1200 may merge image data provided from the depth camera and image data provided from any other camera module (e.g., 1100*a* or 1100*b*) and may generate a three-dimensional (3D) depth image.

In some implementations, at least two camera modules (e.g., 1100*a* and 1100*b*) among the plurality of camera modules 1100*a*, 1100*b*, and 1100*c* may have different fields of view. In this case, the at least two camera modules (e.g., 1100*a* and 1100*b*) among the plurality of camera modules 1100*a*, 1100*b*, and 1100*c* may include different optical lens, but the present disclosure is not limited thereto.

Also, in some implementations, fields of view of the plurality of camera modules 1100*a*, 1100*b*, and 1100*c* may be different. In this case, the plurality of camera modules 1100*a*, 1100*b*, and 1100*c* may include different optical lens, not limited thereto.

In some implementations, the plurality of camera modules 1100*a*, 1100*b*, and 1100*c* may be disposed to be physically separated from each other. That is, the plurality of camera modules 1100*a*, 1100*b*, and 1100*c* may not use a sensing area of one image sensor 1142, but the plurality of camera modules 1100*a*, 1100*b*, and 1100*c* may include independent image sensors 1142 therein, respectively.

Returning to FIG. 13, the application processor 1200 may include an image processing device 1210, a memory controller 1220, and an internal memory 1230. The application processor 1200 may be implemented to be separated from the plurality of camera modules 1100*a*, 1100*b*, and 1100*c*. For example, the application processor 1200 and the plurality of camera modules 1100*a*, 1100*b*, and 1100*c* may be implemented with separate semiconductor chips.

The image processing device 1210 may include a plurality of sub image processors 1212a, 1212b, and 1212c, an image generator 1214, and a camera module controller 1216.

The image processing device 1210 may include the plurality of sub image processors 1212a, 1212b, and 1212c, the number of which corresponds to the number of the plurality of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI) based on the MIPI (Mobile Industry Processor Interface), but the present disclosure is not limited thereto.

Meanwhile, in some implementations, one sub image processor may be disposed to correspond to a plurality of camera modules. For example, the sub image processor 1212a and the sub image processor 1212c may be integrally implemented, not separated from each other as illustrated in FIG. 13; in this case, one of the pieces of image data respectively provided from the camera module 1100a and the camera module 1100c may be selected through a selection element (e.g., a multiplexer), and the selected image data may be provided to the integrated sub image processor.

The image data respectively provided to the sub image processors 1212a, 1212b, and 1212c may be provided to the image generator 1214. The image generator 1214 may generate an output image by using the image data respectively provided from the sub image processors 1212a, 1212b, and 1212c, depending on image generating information Generating Information or a mode signal.

In detail, the image generator 1214 may generate the output image by merging at least a portion of the image data respectively generated from the camera modules 1100a, 1100b, and 1100c having different fields of view, depending on the image generating information Generating Information or the mode signal. Also, the image generator 1214 may generate the output image by selecting one of the image data respectively generated from the camera modules 1100a, 1100b, and 1100c having different fields of view, depending on the image generating information Generating Information or the mode signal.

In some implementations, the image generating information Generating Information may include a zoom signal or a zoom factor. Also, in some implementations, the mode signal may be, for example, a signal based on a mode selected from a user.

In the case where the image generating information Generating Information is the zoom signal (or zoom factor) and the camera modules 1100a, 1100b, and 1100c have different visual fields of view, the image generator 1214 may perform different operations depending on a kind of the zoom signal. For example, in the case where the zoom signal is a first signal, the image generator 1214 may merge the image data output from the camera module 1100a and the image data output from the camera module 1100c and may generate the output image by using the merged image signal and the image data output from the camera module 1100b that is not used in the merging operation. In the case where the zoom signal is a second signal different from the first signal, without the image data merging operation, the image generator 1214 may select one of the image data respectively output from the camera modules 1100a, 1100b, and 1100c and may output the selected image data as the output image. However, the present disclosure is not limited thereto, and a way to process image data may be modified without limitation if necessary.

In some implementations, the image generator 1214 may generate merged image data having an increased dynamic range by receiving a plurality of image data of different exposure times from at least one of the plurality of sub image processors 1212a, 1212b, and 1212c and performing high dynamic range (HDR) processing on the plurality of image data.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other. One of the plurality of camera modules 1100a, 1100b, and 1100c may be designated as a master camera (e.g., 1100b) depending on the image generating information Generating Information including a zoom signal or the mode signal, and the remaining camera modules (e.g., 1100a and 1100c) may be designated as a slave camera. The above designation information may be included in the control signals, and the control signals including the designation information may be respectively provided to the corresponding camera modules 1100a, 1100b, and 1100c through the control signal lines CSLa, CSLb, and CSLc separated from each other.

Camera modules operating as a master or a slave may be changed depending on the zoom factor or an operating mode signal. For example, in the case where the field of view of the camera module 1100a is wider than the field of view of the camera module 1100b and the zoom factor indicates a low zoom ratio, the camera module 1100b may operate as a master, and the camera module 1100a may operate as a slave. In contrast, in the case where the zoom factor indicates a high zoom ratio, the camera module 1100a may operate as a master, and the camera module 1100b may operate as a slave.

In some implementations, the control signal provided from the camera module controller 1216 to each of the camera modules 1100a, 1100b, and 1100c may include a sync enable signal. For example, in the case where the camera module 1100b is used as a master camera and the camera modules 1100a and 1100c are used as a slave camera, the camera module controller 1216 may transmit the sync enable signal to the camera module 1100b. The camera module 1100b that is provided with sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized with the sync signal to transmit image data to the application processor 1200.

In some implementations, the control signal provided from the camera module controller 1216 to each of the camera modules 1100a, 1100b, and 1100c may include mode information according to the mode signal. Based on the mode information, the plurality of camera modules 1100a, 1100b, and 1100c may operate in a first operating mode and a second operating mode with regard to a sensing speed.

In the first operating mode, the plurality of camera modules 1100a, 1100b, and 1100c may generate image signals at a first speed (e.g., may generate image signals of a first frame rate), may encode the image signals at a second speed (e.g., may encode the image signal of a second frame rate higher than the first frame rate), and transmit the encoded image signals to the application processor 1200. In this case, the second speed may be 30 times or less the first speed.

The application processor 1200 may store the received image signals, that is, the encoded image signals in the internal memory 1230 provided therein or the external storage 1400 placed outside the application processor 1200. Afterwards, the application processor 1200 may read and decode the encoded image signals from the internal memory 1230 or the external storage 1400 and may display image data generated based on the decoded image signals. For example, the corresponding one among sub image processors 1212a, 1212b, and 1212c of the image processing device 1210 may perform decoding and may also perform image processing on the decoded image signal.

In the second operating mode, the plurality of camera modules 1100a, 1100b, and 1100c may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the internal memory 1230 or the external storage 1400.

The PMIC 1300 may supply powers, for example, power supply voltages to the plurality of camera modules 1100a, 1100b, and 1100c, respectively. For example, under control of the application processor 1200, the PMIC 1300 may supply a first power to the camera module 1100a through a power signal line PSLa, may supply a second power to the camera module 1100b through a power signal line PSLb, and may supply a third power to the camera module 1100c through a power signal line PSLc.

In response to a power control signal PCON from the application processor 1200, the PMIC 1300 may generate a power corresponding to each of the plurality of camera modules 1100a, 1100b, and 1100c and may adjust a level of the power. The power control signal PCON may include a power adjustment signal for each operating mode of the plurality of camera modules 1100a, 1100b, and 1100c. For example, the operating mode may include a low-power mode. In this case, the power control signal PCON may include information about a camera module operating in the low-power mode and a set power level. Levels of the powers respectively provided to the plurality of camera modules 1100a, 1100b, and 1100c may be identical to each other or may be different from each other. Also, a level of a power may be dynamically changed.

For example, the image sensor device 100 described with reference to FIGS. 1 to 12 may correspond to the image sensor 1142 of FIG. 14. The image sensor 1142 may output the clamp signal to the column line while the reset sampling operation is performed. The clamp signal may be generated based on the operation of the clamp transistor. When the clamp signal is generated, the clamp transistor may operate in the linear region. In this case, the influence of a threshold voltage change of the clamp transistor on the voltage level of the clamp signal may decrease. Accordingly, the clamp circuit may have improved performance and may prevent the sun spot phenomenon from occurring.

According to some implementations of the present disclosure, an image sensor device may include a clamp circuit that prevents a voltage level of a column line from decreasing to a given level or lower. A clamp transistor included in the clamp circuit may operate in a linear region. In this case, the influence of a threshold voltage change of the clamp transistor on the voltage level of the column line may decrease. This may mean that the performance of the clamp circuit is improved. Accordingly, an image sensor device with improved reliability and improved performance and an operation method thereof may be provided.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a combination can in some cases be excised from the combination, and the combination may be directed to a subcombination or variation of a subcombination.

While the present disclosure has been described with reference to implementations thereof, it will be apparent to those of ordinary skill in the art that various changes and modifications may be made thereto without departing from the spirit and scope of the present disclosure as set forth in the following claims.

What is claimed is:

1. An image sensor device comprising:
a pixel configured to operate based on a first power supply voltage, output a first pixel signal to a first column line during a first time period and to output a second pixel signal to the first column line during a second time period;
a clamp circuit configured to operate based on a second power supply voltage that is lower than the first power supply voltage and to output a first clamp signal to the first column line during the first time period; and
a voltage regulator configured to generate the second power supply voltage based on the first power supply voltage,
wherein, during the first time period, a voltage of the first column line is determined based on the first pixel signal and the first clamp signal,
wherein the clamp circuit includes:
a clamp transistor connected between the second power supply voltage and a first node; and
a clamp select transistor connected between the first node and the first column line,
wherein the clamp transistor is configured to operate in response to a clamp control signal,
wherein the clamp transistor is turned on during the first time period,
wherein during the first time period, a voltage of the clamp control signal is higher than the second power supply voltage, and
wherein, during the first time period, a reset sampling operation is performed based on a voltage of the first column line.

2. The image sensor device of claim 1, wherein the clamp select transistor is configured to operate in response to a clamp selection signal.

3. The image sensor device of claim 2, further comprising:
a bias circuit,
wherein the bias circuit includes:
a bias amplifier including a first input terminal, a second input terminal, and an output terminal, wherein the bias amplifier is configured to output the clamp control signal through the output terminal based on a bias signal received through the first input terminal and a voltage of the second input terminal;
a bias transistor connected between the second power supply voltage and the second input terminal, wherein the bias transistor is configured to operate in response to the clamp control signal; and
a bias current source connected between the second input terminal and a ground node.

4. The image sensor device of claim 3, wherein the bias amplifier is configured to operate based on the first power supply voltage.

5. The image sensor device of claim 3, wherein the bias amplifier is configured to operate based on a third power supply voltage,
wherein the third power supply voltage is higher than the first power supply voltage, and
wherein the voltage of the clamp control signal is higher than the first power supply voltage.

6. The image sensor device of claim 2, wherein, during the first time period, the clamp transistor is configured to operate in a linear region.

7. The image sensor device of claim 2, wherein, in response to the clamp selection signal, the clamp select transistor is turned on in the first time period and is turned off in the second time period.

8. An image sensor device comprising:
a control circuit configured to output a first control signal and a clamp selection signal;
a row decoder configured to output a reset signal, a transfer signal, and a selection signal based on the first control signal;
a pixel configured to operate based on a first power supply voltage, to operate in response to the reset signal, the transfer signal, and the selection signal such that a first pixel signal is output to a first column line during a first time period and a second pixel signal is output to the first column line during a second time period; and
a clamp circuit configured to operate based on a second power supply voltage that is lower than the first power supply voltage and to output a first clamp signal to the first column line during the first time period; and
a voltage regulator configured to generate the second power supply voltage based on the first power supply voltage,
wherein the pixel includes:
a photodiode configured to integrate charges in response to a light signal;

a transfer transistor connected between the photodiode and a floating diffusion node, and configured to operate in response to the transfer signal;
a reset transistor connected between a first power supply voltage and the floating diffusion node, and configured to operate in response to the reset signal;
a drive transistor connected between the first power supply voltage and a 0-th node, and configured to operate in response to a voltage of the floating diffusion node; and
a select transistor connected between the 0-th node and the first column line, and configured to operate in response to the selection signal,
wherein the clamp circuit includes:
a clamp transistor connected between a second power supply voltage and a first node, and configured to operate in response to a clamp control signal; and
a clamp select transistor connected between the first node and the first column line, and configured to operate in response to the clamp selection signal,
wherein the clamp transistor is turned on during the first time period,
wherein during the first time period, a voltage of the clamp control signal is higher than the second power supply voltage, and
wherein, during the first time period, a reset sampling operation is performed based on a voltage of the first column line.

9. The image sensor device of claim 8, wherein the control circuit is further configured to output a bias signal, and
wherein the image sensor device further comprises:
a bias circuit,
wherein the bias circuit includes:
a bias amplifier including a first input terminal, a second input terminal, and an output terminal, wherein the bias amplifier is configured to output the clamp control signal through the output terminal based on the bias signal received through the first input terminal and a voltage of the second input terminal;
a bias transistor connected between the second power supply voltage and the second input terminal, wherein the bias transistor is configured to operate in response to the clamp control signal; and
a bias current source connected between the second input terminal and a ground node.

10. The image sensor device of claim 9, wherein the bias amplifier is configured to operate based on the first power supply voltage.

11. The image sensor device of claim 8, wherein, during the first time period, the clamp transistor is configured to operate in a linear region.

* * * * *